US006699977B1

(12) United States Patent
Gerrish et al.

(10) Patent No.: US 6,699,977 B1
(45) Date of Patent: Mar. 2, 2004

(54) LOW METHOXYL PECTINS, PROCESSES THEREOF, AND STABILIZED AQUEOUS SYSTEMS COMPRISING THE SAME

(75) Inventors: Timothy C. Gerrish, Kennett Square, PA (US); Kenneth LeRoy Chambliss, Newark, DE (US); Susan C. Forman, Newark, DE (US)

(73) Assignee: CP Kelco ApS, Wilmington, DE (US)

( * ) Notice: Subject to any disclaimer, the term of this patent is extended or adjusted under 35 U.S.C. 154(b) by 312 days.

(21) Appl. No.: 09/684,968

(22) Filed: Oct. 10, 2000

(Under 37 CFR 1.47)

Related U.S. Application Data

(63) Continuation-in-part of application No. 09/589,888, filed on Jun. 9, 2000, now abandoned.

(51) Int. Cl.[7] ............................................... C08B 37/06
(52) U.S. Cl. .......................................... 536/2; 424/489
(58) Field of Search ........................... 536/1.11; 426/50; 424/489

(56) References Cited

U.S. PATENT DOCUMENTS

| | | | |
|---|---|---|---|
| 2,478,170 A | 8/1949 | Maclay et al. | |
| 2,673,157 A | 3/1954 | Shepherd et al. | |
| 2,856,288 A | 10/1958 | Peebles | |
| 4,219,572 A | 8/1980 | Jackman | |
| 4,268,533 A | 5/1981 | Williams et al. | |
| 4,370,354 A | 1/1983 | Leipold | 426/573 |
| 4,378,381 A | 3/1983 | Turbak et al. | |
| 4,382,966 A | 5/1983 | Mickus et al. | |
| 4,501,759 A | 2/1985 | Gajewski | |
| 4,529,613 A | 7/1985 | Mezzino et al. | |
| 4,699,664 A | 10/1987 | Hettiarachchy et al. | |
| 5,102,676 A | 4/1992 | Aldcroft et al. | |
| 5,286,511 A | 2/1994 | Klavons et al. | |

(List continued on next page.)

FOREIGN PATENT DOCUMENTS

| | | |
|---|---|---|
| EP | 0239938 | 10/1987 |
| EP | 0517423 | 12/1992 |
| EP | 0664300 | 7/1995 |
| GB | 1474990 | 5/1977 |
| GB | 2022393 | 12/1979 |
| WO | 89/12648 | 12/1989 |
| WO | 91/15517 | 10/1991 |
| WO | 94/25575 | 11/1994 |
| WO | 96/04316 | 2/1996 |
| WO | 97/03574 | 2/1997 |
| WO | 00/39168 | 7/2000 |

OTHER PUBLICATIONS

English Abstract of JP 59–205932A.
English Abstract of JP 59–205958A.
English Abstract of JP 8–116890A.
English Abstract of JP 7–264977.
English Abstract of JP 8–112059.
English Abstract of HU 45871T.
English Abstract of JP ZA 8100756A.

(List continued on next page.)

*Primary Examiner*—James O. Wilson
*Assistant Examiner*—Ganapathy Krishnan
(74) *Attorney, Agent, or Firm*—Greenblum & Bernstein, P.L.C.

(57) ABSTRACT

Low methoxyl pectins that display pseudoplasticity and substantially no phase separation in aqueous solutions comprising at least one polyvalent cation, and processes for producing the same. Low methoxyl pectins prepared from non-calcium sensitive pectins. Processes for suspending particulates using low methoxyl pectins prepared from pectins which are not sensitive to polyvalent cations such as calcium, and in particular using low methoxyl pectins prepared from non-calcium sensitive pectins (NCSP). Stabilized aqueous systems containing low methoxyl pectins prepared from non-calcium sensitive pectins.

108 Claims, 3 Drawing Sheets

U.S. PATENT DOCUMENTS

| | | |
|---|---|---|
| 5,376,396 A | 12/1994 | Clark |
| 5,376,397 A | 12/1994 | Gaonkar |
| 5,529,796 A | 6/1996 | Gobbo et al. |
| 5,562,939 A | 10/1996 | Lewis |
| 5,601,861 A | 2/1997 | Gerrish et al. |
| 5,620,727 A | 4/1997 | Gerrish et al. |
| 5,641,532 A | 6/1997 | Pflaumer et al. |
| 5,648,112 A | 7/1997 | Yang et al. |
| 5,656,734 A | 8/1997 | Ehrlich |
| 5,688,923 A | 11/1997 | Gerrish et al. |
| 5,707,847 A | 1/1998 | Christgau et al. |
| 5,866,190 A | 2/1999 | Barey |
| 5,919,500 A | 7/1999 | Lehmberg et al. |
| 5,925,389 A | 7/1999 | Lehmberg et al. |
| 5,952,023 A | 9/1999 | Lehmberg et al. |
| 6,024,991 A | 2/2000 | Lehmberg et al. |
| 6,159,503 A | 12/2000 | Glahn |

OTHER PUBLICATIONS

Kravtchenko et al., Food Macromolecules and colloids; proceedings of a conference; Dijon, Mar. 1994, 349–355, "Colloidal Stability and Sedimentation of Pectin–Stabilized Acid Milk Drinks".

Glahn, FIA–Japan, PEG/JK(dai–24a) —Apr. 4, 1995, pp. 1–6, FIG. 1 and pp. 1–4, and pp. 1–4, and pp. 1–3.

Glahn, Prog. Fd. Nutr. Sci., vol. 6, pp. 171–177, 1982,, "Hydrocolloid Stabilization of Protein Suspensions at Low pH".

Speiser et al., Journal of the American Chemical Society, vol. 68 Feb. 1946, pp. 117–133, "Effect of Molecular Association and Charge Distribution of the Gelation of Pecrin".

Markovic et al., Experientia (Basel)40(8), 1984, pp. 842–843.

Industrial Gums —Polysaccharides and Their Derivatives, Third Edition, Ed. by Whistler et al, Academic Press, New York, 1993, Chapter 10, pp. 257–291.

Matsuura et al., Agric. Biol. Chem., 51(6), 1675–1677, 1987, "Limit to the Deesterification of Citrus Pectin by Citrus Pectinesterase".

Hill et la., Food Technology, vol. 3, Mar. 1949, pp. 90–93, "Enzyme–Demethylated Pectinates and Their Gelation".

Jarvis, Plant, Cell and Environment (1984) 7, 153–164, "Structure and Properties of Pectin Gels in Plant Cell Walls".

Rolin, "Calcium Sensitivity of High Ester Citrus Pectins", 1994, Oxford University Press, edited by Glyn O. Phillips et al., pp. 413–422.

Dirk Hesse, *Instant Pectins for Use in Jams and Marmalades*, Food Marketing & Technology, pp. 12–14 (Dec. 1994).

English abstract of K. Dengler, Kaltloesliche Pektine. Neue Anwendungsmoeglichkelten geschaffen, Lebensmirreltechnik 1996, 28 (12) 34.

English abstract of K. Dengler, Lebensmitteltechnik 28 (12), 34 (0 ref.) 1996.

Abstract of V.J. Morris & G.R. Chilvers, *Cold Setting Alginate–Pectin Mixed Gels*, Journal of the Science of Food and Agriculture 1984, 35 (12) 1370–1376.

Abstract of P. Kooiman, *Cold Water–Extractable Pectin in Cell Walls of Plant Leaves*, Journal of the Science of Food and Agriculture 1969, 20 (1) 18–20.

ASTM Designation: E 1582–93, *Standard Practice for Calibration of Temperature Scale for Themogravimetry* (1994).

D.P. Wiesenborn et al., *Pigment Removal and Pectin Loss During the Continuous Countercurrent Washing of Sunflower Heads*, Transactions of the ASAE 39(5), 1781–1787 (1996).

Anon, *Gum, Set and Match*, Food Manufacture 69(7), 19 (Jul. 1994).

H. Siliha et al., *Effect of a New Canning Process on Cell Wall Pectic Substances, Calcium Retention and Texture of Canned Carrots*, Process in Biotechnology 14, Pectins and Pectinases 495–508 (1996) (Symposium given Dec. 3–7 1995).

Tehchien D. Chou & Jozef L. Kokini, *Rheological Properties and Conformation of Tomato Paste Pectins, Citrus and Apple Pectins*, Journal of Food Science 52(6), 1658–1664 (1987).

LOW METHOXYL PECTINS, PROCESSES THEREOF, AND STABILIZED AQUEOUS SYSTEMS COMPRISING THE SAME

CROSS-REFERENCE TO RELATED APPLICATION

The present application is a coninuation-in-part application of U.S. application Ser. No. 09/589,888 filed Jun. 9, 2000 now abandoned, the entire disclosure of which is expressly incorporated by reference herein. Further, the present application is related to U.S. application Ser. No. 09/589,887 filed Jun. 9, 2000, entitled "Deesterified Pectins, Processes for Producing Such Pectins, and Stabilized Acidic Liquid System Comprising the Same" the entire disclosure of which is expressly incorporated by reference herein.

BACKGROUND OF THE INVENTION

1. Field of the Invention

The present invention is directed to low methoxyl pectins that display pseudoplasticity and no phase separation in aqueous solution comprising at least one polyvalent cation, and processes for producing the same. In particular, the present invention is directed to low methoxyl pectins prepared from non-calcium sensitive pectins. The present invention is also directed to processes for suspending particulates using low methoxyl pectins prepared from pectins which are not sensitive to polyvalent cations such as calcium, and in particular using low methoxyl pectins prepared from non-calcium sensitive pectins (NCSP). Furthermore, the present invention relates to stabilizing particles in aqueous systems containing low methoxyl pectins prepared from non-calcium sensitive pectins.

2. Background of the Invention and Related Art

The problem encountered with drinks containing insoluble components, such as pulps, clouds, insoluble particles, essential oils, and the like, is the tendency of the insoluble components to separate, e.g., via sedimentation or creaming.

In order to maintain insoluble components in suspension, xanthan has been added to fruity drinks to raise the viscosity or alter the rheology of the drink. Xanthan, when added to aqueous solutions even at low concentrations, also exhibits very strong pseudoplasticity and pseudoplasticity at low concentration without any evidence of thixotropy. However, xanthan results in negative organoleptic perception (undesirable mouth-feel) in beverages. Thus, there is a need to provide a suspension aid that has the desired particle suspension properties of xanthan without the undesired mouth-feel.

Alginates and pectins have also been used in beverages in an attempt to suspend insoluble particles. Alginates and pectins, however, tend to undergo syneresis or phase separation during long term storage. Attempts have been made to use pectins as suspension aids with reduced syneresis properties. Pectins are complex polysaccharides having exposed reactive carboxylic acid moieties. More specifically, pectins are composed primarily of D-galacturonic acid, interrupted with sugars such as L-rhamnose. The D-galacturonic acid subunits have reactive sites. In the presence of a polyvalent cation, such as calcium ($Ca^{2++}$), the acid moieties or reactive sites of dissolved pectin form a bridge across the calcium with the acid moieties from other nearby pectin molecules, forming a gelatinous mass.

Pectin is available as either a low methoxyl pectin (LMP) or high methoxyl pectin (HMP). Low methoxyl pectin has a degree of esterification (DE) of less than about 50% and is highly reactive with cations. High methoxyl pectin has a DE of greater than about 50% and is less reactive with polyvalent cations such as calcium.

The term "degree of esterification" is intended to mean the extent to which free carboxylic acid groups contained in the polygalacturonic acid chain of the pectin have been esterified (e.g., by methylation) or in other ways rendered non-acidic (e.g., by amidation).

The structure of the pectin, in particular the DE, dictates many of the resultant physical and/or chemical properties of the pectin. Pectin gelation also depends on the soluble-solids content, the pH and calcium ion concentration. With respect to the latter, it is believed that the calcium ions form complexes with free carboxyl groups, particularly those on LMP.

Pectin, as first extracted, has a relatively high degree of esterification of about 70–75%. Such pectin is ideal for use in jam and jellies. However, other uses require the preparation of pectins with different setting characteristics. This can be accomplished by modifying pectin to reduce the degree of esterification. One common process for achieving this is an acid hydrolysis. Alternative processes are directed to the use of alkali at low temperatures, ammonia, or purified pectin esterase.

During deesterification, the ester groups on the pectin can be removed in a random or blockwise manner. When the ester groups are removed from any galacturonic acid residues chemically or when using very specific enzymes, deesterification can occur in a "random manner." When the ester groups are removed either at non-reducing ends or next to free carboxyl groups by a single-chain mechanism, they are referred to as being deesterified in a "blockwise manner," as blocks of unesterified galacturonic acid units are created. The unesterified galacturonic acid units formed by blockwise deesterification are highly reactive to polyvalent cations. Pectins having such blocks are said to be "calcium sensitive."

Pectins that have been reduced to low methoxyl pectins can gel in the presence of polyvalent cations. Calcium is the most common source of polyvalent cations for food gel applications. Gelation is due to the formations of intermolecular junction zones between homogalacturonic acid units. Because of the electrostatic nature of the bonds, pectins gels are very sensitive to conditions which can modify the environment of the carboxyl groups through which the calcium ion is linked to a neighboring pectin molecule. The gel forming ability of pectin increases with decreasing DE, and low or high methoxyl pectins with blockwise distribution of free carboxyl groups are very sensitive to low calcium levels. As the number and size of blocks along the pectin backbone increase, the sensitivity to calcium increases. However, a typical problem associated with the increasing sensitivity of a pectin to calcium is an increased tendency for the pectin to pre-gel and to display syneresis.

Amidation also increases the gelling ability of low methoxyl pectins. Amidated pectins require less calcium to gel and are less prone to precipitation at elevated calcium levels. Amide groups along the pectin backbone associate through hydrogen bonding allowing gelation at lower calcium levels.

Attempts have been made in the industry to use pectin as a suspending aid. For example, U.S. Pat. No. 5,866,190 issued to Barey discloses compositions for stabilizing a non-milk drink containing insoluble components comprising a pectin and alginate. The pectin of Barey can be amidated or non-amidated HMPs and LMPs. These compositions, however, display high levels of syneresis. It is also essential that the pectin/alginate mixture be dissolved in aqueous medium in the absence of free calcium ions or that a calcium complexing agent be used. The complexing agent is added either to the pectin/alginate solution or to the fruit juice.

EP 0 664 300 A1, and U.S. application Ser. No. 08/161,635 now U.S. Pat. No. 6,143,346 and Ser. No. 08/890,983, now U.S. Pat. No. 6,207,194 to Glahn disclose the use of pectin as a suspension aid in foodstuffs, personal hygienic devices, and in cosmetics. The pectin of Glahn, however, displays an increased tendency to form gels which show high levels of syneresis.

The pectin of Glahn is HMP containing two fractions, a calcium sensitive pectin (CSP) and a non-calcium sensitive pectin (NSCP). "Non-calcium sensitive pectin" fraction refers to a fraction having a lower degree of calcium sensitivity. "Calcium sensitive pectin" fraction refers to a fraction having a higher degree of calcium sensitivity. "Calcium sensitivity" is intended to mean the ability of pectin to become viscous in solution by the addition of calcium.

Typically, commercial low methoxyl conventional (LMC) and low methoxyl amidated pectins are prepared from the unfractionated pectin (containing CSP and NCSP as disclosed in Glahn). Random deesterification by chemical methods and/or enzymatic processes is typically used to prepare low methoxyl pectin from an unfractionated pectin precursor. The resulting pectin is a mixture of low DE CSP with carboxyl blocks of increased size and number with a low DE NCSP fraction with completely random carboxyl distribution. These pectins with larger and more numerous carboxyl blocks are more sensitive to calcium, and thus display an increased tendency to form gels which show high levels of syneresis.

In view of the above, there is an existing need for a pectin suspension aid that has shear thinning behavior for use in aqueous food, cosmetic, and pharmaceutical products.

There is also an existing need for a pectin to produce a stable aqueous system with shear thinning behavior (pseudoplasticity) and acceptable mouth-feel for use as a particle suspending aid. A "stable aqueous system" refers to an aqueous system that can maintain stable viscosity at rest or under controlled shear conditions. "Stable viscosity" or "stability" refers to the maintenance of the insoluble components in suspension and the homogeneity of the suspension initially formed. Rheologically this is often referred to as high, low shear viscosity or pseudoplasticity. Stability also means that the rheology of the aqueous system is stable for a time period of at least one to twelve months or longer.

In addition, there is also an existing need for a pectin that does not undergo syneresis upon storage or form a separate gel phase even in the presence of relatively high levels of calcium such as 250 mM.

SUMMARY OF THE INVENTION

In view of the foregoing, one aspect of the invention is directed to low methoxyl pectins that display pseudoplasticity and no phase separation in an aqueous solution comprising at least one polyvalent cation, and are prepared from non-calcium sensitive pectins. The present invention is also directed to processes for producing low methoxyl pectins prepared from non-calcium sensitive pectins.

The present invention also relates to processes for suspending insoluble components in an aqueous system using low methoxyl pectins that display pseudoplasticity and no phase separation. The present invention is still further directed to stabilizing particles in aqueous systems containing low methoxyl pectins prepared from non-calcium sensitive pectins.

The low methoxyl pectin of the present invention preferably has a degree of esterification from about 20 to 50%, and more preferably from about 24 to 40%.

The molecular weight of the low methoxyl pectin of the present invention is preferably from about 60 to 150 kDalton, and more preferably from about 80 to 100 kDalton.

At a shear rate of about 0.04 $s^{-1}$cPs, the low methoxyl pectin of the present invention preferably has a viscosity of at least about 300 cPs, and more preferably from about 800 to 1,200 cPs.

At a shear rate of about 50 $s^{-1}$cPs, the viscosity of the low methoxyl pectin of the present invention is preferably from about 1 to 20 cPs, and more preferably from about 2 to 10 cPs.

At a shear rate of about 100 $s^{-1}$cPs, the low methoxyl pectin of the present invention preferably has a viscosity from about 1 to 15 cPs, and more preferably from about 2 to 7 cPs.

The low methoxyl pectin of the present invention can be a powder form or an aqueous form having a pH from about 2 to 6.

The degree of amidation of the low methoxyl pectin of the present invention is preferably from about 1 to 30%, and more preferably from about 4 to 21%.

The degree of esterification of the low methoxyl pectin of the present invention is preferably from about 30 to 55%, and more preferably from about 40 to 52%.

As discussed above, the present invention is directed to a process for preparing a low methoxyl pectin displaying pseudoplasticity and substantially no phase separation in an aqueous solution comprising at least one polyvalent cation which comprises treating a pectin starting material having a degree of esterification of greater than about 60% to obtain at least a non-calcium sensitive pectin fraction.

The process of the present invention is prepared by (a) treating a pectin starting material having a degree of esterification of greater than about 60% with a cation-containing preparation to obtain at least a non-calcium sensitive pectin fraction and a calcium sensitive pectin fraction; (b) separating the non-calcium sensitive pectin fraction from the calcium sensitive pectin fraction; and (c) deesterifying or deesterifying and amidating the non-calcium sensitive pectin fraction to obtain the low methoxyl pectin.

Alternatively, the non-calcium sensitive pectin is prepared by (a) treating a pectin starting material having a degree of esterification of greater than about 60% with an enzyme to obtain the non-calcium sensitive pectin fraction; or (b) reesterifying the calcium sensitive pectin fraction to obtain the non-calcium sensitive pectin fraction.

The pectin starting material has a degree of esterification which is at least about 60%, and more preferably at least about 70%.

The pectin starting material is obtained from at least one of citrus peels, apple juices, apple ciders, apple pomace, sugar beets, sunflower heads, vegetables or waste products from plants selected from at least one of apples, sugar beet, sunflower and citrus fruits, and more preferably from at least one of limes, lemons, grapefruits, and oranges.

The process of the present invention is prepared by deesterifying or deesterifying and amidating a non-calcium sensitive pectin to obtain the low methoxyl pectin.

The non-calcium sensitive pectin is deesterified with an acid in a random fashion to obtain the low methoxyl pectin. The acid is at least one of nitric, hydrochloric, and sulfuric. The degree esterification of the low methoxyl pectin is from about 20 to 55%, and more preferably from about 24 to 40%.

The process of the present invention can be prepared by deesterifying and amidating a non-calcium sensitive pectin with a base in a random fashion to obtain the low methoxyl pectin. The base is at least one of sodium hydroxide and ammonia.

The degree of esterification that is at least about 1% and at most about 15% higher than the degree of esterification of the starting material, and more preferably at least about 7% and at most about 15% higher than the degree of esterification of the starting material.

As discussed above, the present invention is directed to a process for stabilizing particulates in an aqueous system which comprises adding a low methoxyl pectin to an aqueous system containing suitable concentration of polyvalent cations, wherein said low methoxyl pectin displays pseudoplasticity and substantially no phase separation in an aqueous solution comprising at least one polyvalent cation. The process further comprises adding a food, or cosmetic or pharmaceutical product to the aqueous system.

Also as discussed above, the present invention is directed to a stabilizing particles in aqueous system containing a low methoxyl pectin that displays pseudoplasticity and substantially no phase separation. The pH of the aqueous system is from about 2.5 to 5, and more preferably from about 3 to 5.

The aqueous system of the present invention can comprise at least one of food product, cosmetic product, and pharmaceutical product.

Accordingly, it would be desirable to be able to provide pectin for use in suspending particulates in aqueous systems that: (1) has high, low shear viscosity, i.e., displays shear thinning (pseudoplastic) properties; (2) has shear thinning properties with acceptable mouth-feel; (3) displays significantly reduced syneresis and/or phase separation in the presence of relatively high levels of calcium and over long storage periods; and (4) undergoes minimal changes in rheology during long term storage.

DETAILED DESCRIPTION OF THE INVENTION

Figure 1:
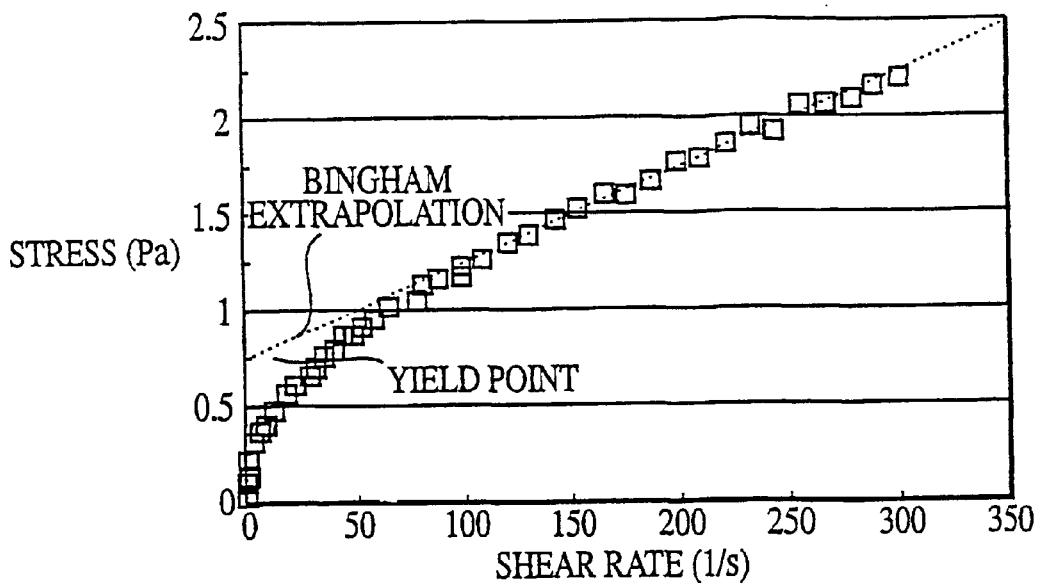
FIG. 1 illustrates that the yield point of a beverage system can be determined from the linear plot of stress (Pa) as a function of shear rate ($s^{-1}$) by the Bingham extrapolation method.

The present invention is directed to a low methoxyl pectin (LMP) that displays pseudoplasticity and substantially no phase separation in an aqueous solution comprising at least one polyvalent cation.

Pseudoplasticity is the rheological behavior most desired for stabilization of particles in aqueous solution. An aqueous solution is characterized as being pseudoplastic if it displays extremely high viscosity "at rest" (i.e., at zero shear rate) and low viscosity when shear is applied. This is also referred to as "shear thinning."

The viscosity of the LMP of the present invention is as follows: at a low shear rate of 0.04 $s^{-1}$cPs, the viscosity is at least about 300 cPs, preferably about 300 to 2,000 cPs, more preferably from about 400 to 1,800 cPs, and most preferably from about 800 to 1,200 cPs; at a high shear rate of 50 $s^{-1}$cPs, the viscosity is about 1 to 20 cPs, preferably about 1 to 10 cPs, more preferably from about 2 to 10 cPs, and most preferably from about 3 to 5 cPs; and at a high shear rate of 100 $s^{-1}$cPs, the viscosity is about 1 to 15 cPs, preferably about 1 to 8 cPs, more preferably from about 2 to 7 cPs, and most preferably from about 3 to 5 cPs.

"Phase separation" refers to the formation of a clear liquid above a suspended bed of particles, often with a clear boundary line. Phase separation could also be referred to as particle sedimentation for the aqueous system containing the pectin of the present invention. Severe phase separation is characterized by clear liquid surrounding the particle bed on the sides as well as the bottom. Phase separation can include, but is not limited to, particle sedimentation and/or gel contraction. "Syneresis" is another term, often used with firm gels and not fluid gels, which is essentially the same as gel contraction, and is yet another representation of phase separation. The test for determining phase separation is described below in the example section labeled "Determination of Particle Sedimentation", which is used to determine phase separation for particle sedimentation.

"Substantially no phase separation" refers to less than 10% of phase separation in the cationic aqueous solution containing the low methoxyl pectin of the present invention. The phase separation of the low methoxyl pectin of the present invention is preferably at most about 10%, more preferably at most about 7%, even more preferably about 5%, and at most about 3%.

"Substantially no particle sedimentation" refers to less than 10% of particle sedimentation present in the cationic aqueous solution containing the low methoxyl pectin of the present invention. The particle sedimentation of the low methoxyl pectin of the present invention is preferably at most about 10%, more preferably at most about 7%, even more preferably about 5%, and at most about 3%.

In addition, although the LMP of the present invention does not substantially form weak gels in an aqueous solutions, it can gel in the presence of polyvalent cations. Examples of polyvalent cations preferably include, but are not limited to, calcium ions, magnesium ions, manganese ions, iron ions, copper ions, and aluminum ions, more preferably calcium ions and magnesium ions, and most preferably calcium ions.

The amount of the polyvalent cation present in the aqueous solution is preferably in the amount of about 10 ppm to about 1,000 ppm, more preferably about 50 ppm to about 500 ppm, still more preferably about 100 ppm to about 400 ppm, and most preferably about 200 to about 300 ppm.

The low methoxyl pectin (LMP) of the present invention is also non-thixotropic in aqueous solution containing suitable concentration of polyvalent cations. That is, the LMP of the present invention aids the aqueous solution to rebuild viscosity or recover very quickly when shear is removed.

The LMP of the present invention is prepared from non-calcium sensitive pectins. As discussed above, "non-calcium sensitive pectin" fraction refers to a fraction having a lower degree of calcium sensitivity. "Calcium sensitive pectin" fraction refers to a fraction having a higher degree of calcium sensitivity. "Calcium sensitivity (CS)" is intended to mean that property of a pectin product related to an increase in the viscosity of a solution of the pectin product under appropriate conditions.

The LMP of the present invention can be in a form of a powder or aqueous system. The pH of the aqueous system is preferably about 6 to 0.5, more preferably about 5 to 1, and most preferably about 4 to 2.

The LMP of the present invention is prepared by (1) deesterifying, or (2) deesterifying and amidating a non-calcium sensitive pectin (NCSP) with at least one of acid, base, and enzyme.

Examples of suitable acids include, but are not limited to, nitric, hydrochloric, sulfuric, preferably nitric and hydrochloric, and more preferably nitric.

Examples of the base include, but are not limited to, sodium hydroxide and ammonia, preferably sodium hydroxide and ammonia, more preferably ammonia.

Examples of the enzyme include, but are not limited to, polygalacturonase, pectate lyase, preferably fungal pectin esterase, and more preferably pectin methylesterase (random).

In one preferred embodiment of the present invention, the NCSP is preferably deesterified with an acid in a random fashion to produce low methoxyl conventional pectins (LMC pectins). The LMC pectins of the present invention have a molecular weight from about 60 to 150 kDalton, preferably from about 70 to 120 kDalton, and most preferably from about 80 to 120 kDalton.

The molecular weight of the pectin of the present invention is preferably calculated by measuring the relative viscosity of a 0.1% pectin solution using Na-hexametaphosphate. The apparatus used in this calculation are (1) at least two Witeg-Ostwald-viscosimeters or similar viscometers with 100 to 150 second outlet time for water (25° C.); (2) transparent thermostated water bath (25.0° C.±0.3° C.); and (3) digital stop watch.

The reagent used in calculating the molecular weight of the pectin is Na-hexametaphosphate which is prepared by: (a) dissolving 20.0 g of Na-hexametaphosphate in 1800 ml ion exchanged deaerated (boiled) water; (b) adjusting the pH to 4.50±0.05 with 1 M HCl; and (c) diluting the solution with ion exchanged deaerated (boiled) water until 2000 ml.

The procedure for calculating the molecular weight of the pectin is as follows: (1) clean the viscometers; (2) measure the outlet time on the viscometers for each freshly prepared hexametaphosphate solution and for every new working day where pectin solutions are being measured and immediately before measuring the necessary quantity of hexametaphosphate solution is filtered through a glass filter No. 3; (3) determine the pectin sample system as follows: (a) acid wash the pectin; (b) weigh approximately 90 g hexametaphosphate solution in a tared beaker with magnet; (c) gradually add 0.1 g acid washed pectin to the 90 g hexametaphosphate solution in a tared beaker while stirring; (d) heat the solution to 70° C. while stirring until the pectin is completely dissolved; (e) cool the solution to 25° C.; (f) q.s. (weigh up) to 100.0 g with hexametaphosphate solution; and (g) filter through a glass filter No. 3; (4) measure the outlet time for every molecular weight determination on two different viscometers; and (5) calculate the molecular weight separately for each viscosimeter using the latest measured outlet time for hexametaphosphate solution on the viscosimeter in question. If the difference between two calculated molecular weights is less than 3,500, the mean value is calculated by rounding off the value to the nearest multiple of 1,000. If the difference between the two calculated molecular weights is 3,500 or more, clean the viscometers and measure a new outlet time for hexametaphosphate solution.

The outlet time is measured by the conducting the following procedure: (1) rinse the viscosimeter twice with the sample; (2) pour 5.00 ml of the sample in the viscosimeter and place it in the thermostated water bath at 25.0° C.±0.3° C. at least 15 minutes prior to measuring; and (3) measure time on the two outlets. If the difference between the times is more than 0.2 seconds on measuring hexametaphosphate solution or 0.4 seconds on measuring samples, the measuring is repeated until there are three outlet times which differ no more than 0.2 seconds on measuring hexametaphosphate solution or 0.4 seconds on measuring samples. The outlet time which is needed for further calculations is the mean value of the above mentioned two or three identical or almost identical measuring results.

The relative viscosity is calculated as follows:

$$n_r=(t_o-K/t_o)/(t_h-K/t_h)$$

wherein $t_o$ and $t_h$ are the outlet times for pectin solution and hexametaphosphate solution, respectively, wherein $K=(Q \times t^2_v)/(Q+(0.226 \cdot L \cdot t_v))$, and wherein Q=volume of viscosimeter bulb in cm$^3$, L=length of capillary tube in cm and $t_v$=outlet time for water in seconds.

The molecular weight of pectin is then calculated as follows:

$$M=1.277 \cdot 10^6(n_r^{1/6}-1) \text{ g/mol}$$

Furthermore, not wishing to be bound by theory, the LMC pectins of the present invention have a degree of esterification (DE) from about 20 to 55%, preferably from about 22 to 50%, more preferably from about 25 to 35%, and most preferably from about 24 to 40%.

As discussed above, the term "degree of esterification" is intended to mean the extent to which free carboxylic acid groups contained in the polygalacturonic acid chain of the pectin have been esterified (e.g., by methylation) or in other ways rendered non-acidic (e.g., by amidation).

In one preferred embodiment of the present invention, the NCSP is deesterified and amidated with a base in a random fashion to produce low methoxyl amidated pectins (LMA pectins). Not wishing to be bound by theory, the LMA pectins of the present invention have a molecular weight from about 60 to 150 kDalton, preferably from about 70 to 120 kDalton, and most preferably from about 80 to 120 kDalton.

In addition, not wishing to be bound by theory, the LMA pectins of the present invention have a degree of esterification preferably from about 30 to 55% and most preferably from about 40 to 52%, and a degree of amidation (DA) preferably from about 1 to 30%, and most preferably from about 4 to 21%.

The preferred LMA pectins of the present invention have a DE from about 40 to 52% with a DA from about 1 to 50%, preferably 2 to 40%, more preferably from about 4 to 25%, and most preferably from about 6 to 20%.

As discussed above, the present invention is directed to a process for preparing a low methoxyl pectin displaying pseudoplasticity and substantially no phase separation in an aqueous solution comprising at least one polyvalent cation which comprises treating a pectin starting material having a degree of esterification of greater than about 60% to obtain at least a non-calcium sensitive pectin fraction.

The process of the present invention is prepared by (a) treating a pectin starting material having a degree of esterification of greater than about 60% with a cation-containing preparation to obtain at least a non-calcium sensitive pectin fraction and a calcium sensitive pectin fraction; (b) separating the non-calcium sensitive pectin fraction from the calcium sensitive pectin fraction as disclosed in U.S. Ser. No. 08/161,635, issued as U.S. Pat. No. 6,159,503, and U.S. Ser. No. 08/890,983, issued as U.S. Pat. No. 6,207,194 to Glahn, the disclosures of which are incorporated herein by reference; and (c) deesterifying or deesterifying and amidating the non-calcium sensitive pectin fraction to obtain the low methoxyl pectin.

Alternatively, the non-calcium sensitive pectin is prepared by (a) treating a pectin starting material having a degree of esterification of greater than about 60% with an enzyme to obtain the non-calcium sensitive pectin fraction; or (b) reesterifying the calcium sensitive pectin fraction to obtain the non-calcium sensitive pectin fraction.

"Pectin starting material" is intended to mean a pectin product obtained by separation of pectin from a plant material. The pectin starting material can preferably be obtained from citrus peels, apple juices, apple ciders, apple pomace, sugar beets, sunflower heads, vegetables or waste products from plants such as apples, sugar beet, sunflower and citrus fruits, more preferably apples and citrus plants, and most preferably citrus plants such as limes, lemons, grapefruits, and oranges.

The pectin starting material can, for example, be the acid pectin extract after purification or it could be wet pectin cake obtained after treating the acid extracted pectin solution with alcohol. Further, the pectin starting material can, for example, be the dried or partly dried pectin in the pectin cake from precipitation, or it could be the dried, milled pectin powder as normally produced by pectin manufacturers.

The pectin starting material can be treated with a cation-containing preparation. As used herein, "cation-containing preparation" is intended to mean any source of free cations. Examples of the cation include, but are not limited to, metal ions derived from salts selected from at least one of alkaline earth metal salts, alkali metal salts, transition metal salts or mixtures thereof.

Examples of the metal ion include, but are not limited to, one or more of the following: calcium, iron, magnesium, zinc, potassium, sodium, aluminum, manganese, and mixtures thereof. Preferably, the metal ion is selected from one or more of the following: calcium, iron, zinc, and magnesium. More preferably, the metal cation is calcium. Mixtures of two or more metal cations can be employed. However, if a monovalent metal cation is employed, a di- or trivalent metal cation is preferably present. When such mixtures are used, the preferred metal cation is calcium.

The metal ions can be derived from one or more of the following: alkaline earth metal salts, alkali metal salts, transition metal salts, and mixtures thereof, provided that such salts are reasonably soluble in the solvent, e.g., water or water/alcohol mixtures.

Examples of metal salts that can be used in the practice of the present invention, provided they are soluble in the solvent, include, but are not limited to, calcium nitrate, calcium acetate, calcium acid phosphate, calcium carbonate, calcium chloride, calcium citrate, calcium dihydrogen phosphate, calcium formate, calcium gluconate, calcium glutamate, calcium glycerate, calcium glycerophosphate, calcium glycinate, calcium hydrogen phosphate, calcium hydroxide, calcium iodide, calcium lactate, calcium lactophosphate, calcium magnesium carbonate, calcium magnesium inositol hexaphosphate, calcium phosphate tribasic, calcium-o-phosphate, calcium propionate, calcium pyrophosphate, calcium succinate, calcium sucrate, calcium sulfite, calcium tetraphosphate, iron (II) acetate, iron (III) acetate, iron (III) ammonium chloride, iron (III) ammonium citrate, iron (II) ammonium sulfate, iron (II) acetate hydroxide, iron (III) carbonate, iron (II) chloride, iron (III) chloride, iron choline citrate, iron (II) citrate, iron dextran, iron (II) formate, iron (III) formate, iron (III) hypophosphite, iron (II) lactate, iron (II) acetate, iron (II) phosphate, iron (III) potassium oxalate, iron (III) pyrophosphate, iron (III) sodium citrate, iron (III) sodium pyrophosphate, iron (II) sulfate, iron (III) sulfate, magnesium ammonium phosphate, magnesium ammonium sulfate, magnesium carbonate, magnesium chloride, magnesium citrate, magnesium dihydrogen phosphate, magnesium formate, magnesium hydrogen phosphate, magnesium hydrogen-o-phosphate, magnesium hydroxide, magnesium hydroxide carbonate, magnesium lactate, magnesium nitrate, magnesium oxalate, magnesium oxide, magnesium phosphate, magnesium propionate, magnesium pyrophosphate, magnesium sulfate, zinc acetate, zinc ammonium sulfate, zinc carbonate, zinc chloride, zinc citrate, zinc formate, zinc hydrogen phosphate, zinc hydroxide, zinc lactate, zinc nitrate, zinc oxide, zinc phosphate, zinc phosphate monobasic, zinc phosphate tribasic, zinc-o-phosphate, zinc propionate, zinc pyrophosphate, zinc sulfate, zinc tartrate, valerate, and zinc-iso-valerate.

The preferred salts are calcium salts such as calcium nitrate, calcium chloride, calcium hydroxide, calcium acetate, calcium propionate, calcium oxide, calcium gluconate, calcium lactate, and calcium carbonate. The most preferred calcium salt is calcium nitrate.

The cation-containing preparation preferably contains a di- or trivalent cation, and optionally at least one water miscible solvent. The water miscible solvent is selected from one or more of the following: methyl alcohol, ethyl alcohol, propyl alcohol, isopropyl alcohol, acetone, and ethyl acetate. Under mixing or extrusion conditions, the polyvalent cation forms an insoluble cation pectinate salt or gel when contacted with the pectin solution. A portion of the pectin does not form such an insoluble salt or gel with the polyvalent cations, but diffuses out of the gel into the salt solution forming a separate pectin phase in said solution. The pectin can, accordingly, be separated into two or more fractions. The first fraction contains pectin that has reacted with the cation forming a gel matrix insoluble in the solvent. The first fraction is calcium sensitive and is called the calcium sensitive pectin fraction (CSP). The second fraction does not form such a gel matrix and diffuses out of the gel and into the surrounding liquid. The second fraction is not calcium sensitive and is referred to as the non-calcium sensitive pectin fraction (NCSP).

The preferred cation is calcium ions in aqueous solution, optionally mixed with a solvent such as methyl alcohol, ethyl alcohol, propyl alcohol, isopropyl alcohol, acetone, ethyl acetate, and any other organic solvent that is miscible with water. The amount of cation in aqueous solution is preferably from about 500 to 5,000 ppm, more preferably from about 1,000 to 4,000 ppm, and most preferably from about 2,500 to 3,500 ppm. When mixed with alcohol, care should be exercised to avoid alcohol levels that will result in precipitation of an insoluble pectin compound. The preferred solution is a mixture of alcohol and water, and the most preferred is a mixture of isopropyl alcohol and water. The ratio of alcohol and water is preferably from about 1:5 to 1:20, more preferably from about 1:7 to 1:15, and most preferably from about 1:8 to 1:12.

The cation concentration can be varied over a wide range, with the upper limit being determined only by economic and practical considerations. The preferred upper limit of the cation concentration is about 125 millimoles cation per liter of reaction medium (125 mM). What is meant by reaction medium is what actually results from reacting the pectin starting material with the cation-containing preparation.

A more preferred upper limit of the cation concentration is about 85 mM, wherein molarity is by definition a per unit volume (liter) concentration. The lower limit of the cation concentration is determined by that amount of cation that would provide the desired degree of separation into the at least first and second fractions. The preferred lower limit is about 5 mM cation. A more preferred lower limit is about 12.5 mM cation, with about 65 mM being the most preferred lower limit.

The pH of the reaction medium influences the matrix-forming ability of the pectin starting material. If the pH is too low, no matrix is formed. The pH of the reaction medium is at least about 2. The lower limit is preferably at least about 3, with about 4 being the most preferred. The upper limit of the pH is only determined by the stability of the pectin starting material under the combination of pH, temperature, and time being used. The upper limit of the pH is about 8. The preferred upper limit is about 6, with about 5 being the most preferred upper limit.

As indicated above, the process in accordance with the present invention comprises treating pectin starting material having a DE of greater than about 60% to obtain at least a first fraction having a higher degree of calcium sensitivity than the pectin starting material and a second fraction having a lower degree of calcium sensitivity than the pectin starting material. Preferably, the DE of the pectin starting material is at least about 60% and more preferably at least about 70%.

The ratio of calcium sensitive pectin (CSP) to the sum of CSP and non-calcium sensitive pectin (NCSP) is hereinafter referred to as Calcium Sensitive Pectin Ratio (CSPR). As indicated above, the pectins in accordance with the present invention have a CSPR greater than about 0.60. The preferred pectins have a CSPR of at least about 0.65. The more preferred CSPR is about 0.75, and the most preferred CSPR is at least about 0.85.

Calcium sensitivity can be calculated by any technique known in the art. Preferably, the calcium sensitivity can be calculated by measuring calcium sensitivity (CS) of pectin in a solution with gum. Specifically, calcium salt and pectin are mixed at low pH where there is no strong setting of calcium ions and pectin. Then the reaction between pectin and calcium ions is started by addition of sodium acetate/acetic acid buffer. The apparatus used in this calculation are: (1) plate magnetic stirrer (IKA MAG EOA 9); (2) magnetic stirrer (JK IKA-Combimag REO); (3) 50×110 mm viscosity glass (Holm & Halby); (4) 25 ml dispenser; (5) 5 ml automatic pipette; (6) Brookfield viscosimeter LVT; (7) pH-meter; (8) technical balance; (9) analytical balance; (10) 42 mm TRIKA magnets; and (11) cooling bath (thermostatically controlled at 25° C.).

The reagents used in this calculation are (1) 1.000 M HCl; (2) 1 M acetate buffer at pH 4.75 (68.04 g/l of 500 mM $CH_3COONa$ and $3H_2O$, and 28.6 ml/l of 500 mM $CH_3COOH$ (100%)); and (3) 250 mM calcium chloride (36.7550 g/l $CaCl_2$ and $2H_2O$). Ion exchanged water with a conductivity below 1.0 uS/cm must be used in all solutions. The pectin solution contains 400 g pectin solution with 2.4 g pure gum (0.6% sol.). If the testing sample is not 100% gum (pure gum), correct the sample using the following formula (A=the gum % of the sample):

$$(0.6 \times 400)/A = \text{g sample with } A\% \text{ gum for 400 g solution}$$

The procedures for the calculating the calcium sensitivity are as follows: (1) weigh out the pectin with adjusted sugar percentage to 3 decimals; (2) disperse the pectin into 240 ml boiling ion-exchanged water in a high shear mixer; (3) pour the solution into a tared beaker with magnet; (4) pour additional 100 ml ion exchanged water into the mixer and add to the solution; (5) cool the pectin solution to about 25° C.; (6) adjust the pectin solution to a pH of 1.5 with 1 M HCl; (7) weigh the solution to 400 g; (8) weigh out 145 g±1 g pectin solution in a viscosity glass; (9) put a TRIKA magnet in the glass; (10) add 5 ml 250 mM Ca++ solution to the pectin solution while stirring with the plate magnetic stirrer at step (1). Stir for 2 min; (11) add 25 ml 1 M acetate buffer with dispenser to the glass while stirring with a magnetic stirrer (JK IKA-Combimag REO) (the pH is about 4.2); (12) by means of the plate magnetic stirrer at step (1), stir for additional 2 minutes; (13) remove the magnet and let the solution rest at 25° C. until next day; and (14) measure calcium sensitivity as viscosity in cP with Brookfield LVT viscosimeter at 60 rpm. at 25° C. (use the thermostatically controlled water bath).

In one preferred embodiment of the present invention, the first fraction preferably has a degree of esterification of at least 1% lower than the degree of esterification of the starting material, more preferably at least 3% lower and most preferably at least 5% lower than the degree of esterification of the starting material. The second fraction preferably has a degree of esterification of at least 1% higher than the degree of esterification of the starting material, more preferably a degree of esterification of at least 3% higher, and most preferably at least 7% higher than the degree of esterification of the starting material.

The separation of the first and second fractions in accordance with the present invention is preferably performed as a separation into a gel phase and a liquid phase, respectively. The gel phase is predominantly the reaction product of the cation in the cation-containing preparation and the calcium-sensitive fraction present in the pectin starting material. The liquid phase is predominantly the pectin fraction in the starting material that does not form a gel with the cation-containing preparation. Various techniques conventional in the art can be used to perform the separation step. Preferably, the separation is performed by physical separation (filtration) using a washing solution, such as a mixture of IPA, water and cation to complete the separation. The composition of the preferred washing solution contains the same cation-containing preparation (including a solvent) used to treat the pectin starting material.

After the washing steps, the first fraction has a calcium sensitivity (CS) of at least about 10% higher than the calcium sensitivity of the starting material. The CS of the first fraction preferably is at least about 25% higher than the starting material, more preferably at least about 50% higher than the starting material, and most preferably at least about 100% higher than the starting material.

In a preferred embodiment of the present invention, the purified pectin starting material is reacted with a solution of a cation salt under moderate agitation conditions such as mixing or wet spinning, forming large gel particles visible to the naked eye. The gel particles can then be separated in any appropriate way from the liquid and resuspended in fresh liquid or liquid containing a lower concentration of the NCSP.

The two isolated fractions, the CSP containing gel fraction and the NCSP containing solution fraction can further be treated separately with additional solvent such as IPA to isolate the pectin from the wash liquid. This step can also be described as a dehydration step.

The gel fractions containing the NCSP or the CSP can be treated separately and converted into the acid form or a salt of a monovalent metal or of ammonia by treating the alcohol precipitated fractions with an acid alcohol solution washing out the polyvalent metals. The fractions may then be partly or completely neutralized by washing with an alcohol solution of the desired salt.

Alternatively, the fractions may be acidified before the alcoholic precipitation and subsequently washed with acid alcohol. Further, the fractions may be treated with an ion exchange resin carrying the desired monovalent cation and subsequently precipitated with alcohol.

Both fractions can be dehydrated, dried and milled. The dehydration as discussed above is performed to remove the bulk of the water before the drying step. While any known technique can be used for dehydration, the fractions are preferably treated with alcohol. The water/alcohol phase formed in the dehydration is substantially removed by decantation, centrifuge or filtration using any known technique. Drying is accomplished by known techniques, e.g., atmospheric or reduced-pressure ovens, to a moisture content of less than about 50wt. %, preferably less than about 25wt. %. The drying temperature is maintained below the temperature at which the pectin starts to lose its properties, e.g., color, molecular weight, etc. Any known milling technique can be used to mill the pectin product to the desired particle size. It is most preferred that the final product be in dry, powder form, with a moisture content of about 12wt. % or less. Dry powder form is intended to mean that the product be pourable without substantial caking. The preferred final product is in the form of powder for ease of use.

The NCSP of the present invention can preferably be prepared in a continuous process, but a single batch is also possible.

As discussed above, the low methoxyl pectins of the present invention can be prepared from a fractionated NCSP as disclosed in U.S. Ser. No. 08/161,635 now U.S. Pat. No. 6,143,346 and Ser. No. 08/890,983 now U.S. Pat. No. 6,207,194 to Glahn. Alternatively, the low methoxyl pectin of the present invention can be prepared from an NCSP obtained by mechanisms other than fractionation.

The NCSP of the present invention is prepared by any known techniques in the art, such as reesterification of calcium sensitive pectins or mixtures of calcium and non-calcium sensitive pectins with methanol either by chemical or enzymatic methods. In addition, enzymes can also be used to remove or cut out carboxyl regions or blocks of carboxyl groups along the galacturonic acid backbone of the pectin starting material, and thus producing a non-calcium sensitive pectin. Examples of such enzymes preferably include, but are not limited to, polygalacturonase and pectate lyase.

Other mechanisms used to enhance the relative level of non-calcium sensitive pectin in plant tissue before it is extracted include transgenic or genetic modification techniques which can direct the specific production of non-calcium sensitive pectins in typical pectin raw materials such as citrus plants or as the result of expression in host plants such as sugar cane or corn. Finally, there are other extraction mechanisms that can be used to selectively isolate non-calcium sensitive pectin from plant tissue. Manipulation of particular pH or cation or mixtures thereof in the extraction mixture, or selection for one specific fraction of citrus peel over another, isolation separately of NCSP or CSP can also be achieved.

As discussed, the NCSP can be deesterified to produce LMC pectins of the present invention. Preferably, the NCSP is prepared by the fractionation mechanism as disclosed by Glahn. The NCSP is preferably a dry powder or a solution, most preferably a solution. The concentration of NCSP in the solution is from about 0.5 to 4 wt. %, preferably from about 1 to 3 wt. %, and most preferably from about 1 to 2 wt. %.

Preferably, the LMC pectins of the present invention can be prepared by charging an NCSP solution to a reactor vessel and the temperature is adjusted to a range from about 20 to 60° C., more preferably from about 30 to 55° C., and most preferably from about 45 to 50° C. The pH of the solution is adjusted to a range from about 0.5 to 2.5, preferably from about 0.5 to 1.5, most preferably from about 0.7 to 1.1. The acid used for pH adjustment can be a nitric, hydrochloric or sulfuric acid, preferably nitric or hydrochloric acid, most preferably nitric acid. The reaction is preferably allowed to progress for about 10 to 200 hours, more preferably for about 15 to 100 hours, and most preferably for about 20 to 75. To isolate the low methoxyl pectins from solution and dehydrate, the acidified or partially neutralized extracts are added to 2 volumes of 60% IPA to precipitate the pectin. The precipitate is pressed on a band press to remove excess water and IPA. The pectin press cake is resuspended in an additional 2 volumes of IPA and mixed. To this mixture a solution of sodium carbonate (1 kg sodium carbonate to 4 liters of water) can be added in sufficient quantity to achieve a pH of 5.0 of the mixture or final pectin pH of 4.5 when measured in a 1% aqueous solution. The neutralized pectin is again belt pressed. The pressed pectin is dried and ground to a powder.

In addition, as discussed above, the NCSP can be deesterified and amidated to produce the LMA pectin of the present invention. Preferably, the NCSP is prepared by the fractionation mechanism of Glahn. The NCSP is preferably a dry power or a suspension in alcohol or an alcoholic press cake. Most preferably, the NCSP is provided as a suspension in alcohol. The concentration of pectin in the alcoholic suspension is preferably from about 0.5 to 50%, more preferably from about 10 to 40%, and most preferably from about 20 to 30%. The composition of the suspending alcoholic solution is preferably about 40/60 alcohol to water, more preferably about 60/40 alcohol to water, and most preferably about 70/30 alcohol to water. The alcohol used is preferably a methanol, ethanol or isopropyl alcohol, and most preferably an ethanol or isopropyl alcohol. The suspension is preferably cooled to a temperature from about 1 to 25° C., more preferably from about 3 to 15° C., and most preferably from about 3 to 10° C. $NH_4OH$ (28–29% ammonia water manufactured by Baker Chemical) is added to the mixture. Optionally, $NH_3$ (gas) is added to the mixture. Sufficient ammonia (hydroxide or gas) is preferably added to increase the pH from about 8 to 13.5, more preferably from about 9 to 13, and most preferably from about 10.5 to 12.5. The desired pH is maintained within +/−0.2 pH units by adding $NH_4OH$ or $NH_3$. The reaction is preferably allowed to continue for about 0.5 to 15 hours, more preferably for about 1 to 10 hours, and most preferably for about 1 to 6 hours over which time an additional $NH_4OH$ or $NH_3$ is consumed. The reaction mixture is terminated by removing excess reaction liquid and adding acid to lower the pH. Acidified 60/40 $IPA/H_2O$ (pH adjusted to 1.5–2.0 with $HNO_3$) is added to the reactor and mixed. Additional $HNO_3$ is added to adjust pH to 3.3–3.6. The mixture is preferably allowed to mix for about 0.5 to 5 hours, more preferably for about 1 to 4 hours, and most preferably for about 2 to 3 hours. The excess acid wash liquid is removed from the mixture by vacuum or filtration. The isolated pectin is washed with 70/30 IPA/H$_2$O. Washing and filtering the pectin is repeated at least two additional times with fresh 70/30 IPA/H$_2$O wash. The isolated pectin is dried and ground to a powder.

In accordance with the present invention, the low methoxyl conventional pectin and low methoxyl amidated pectin prepared from NCSP can be used in a process for stabilizing insoluble components in aqueous systems. "Stabilizing insoluble components" can include, but is not limited to, suspending insoluble components. "Insoluble components" refer to any insoluble particulates such as pulps, essential oils, coloring agents such as natural or otherwise, minerals, botanicals, and pharmaceuticals that have the tendency to phase separate into one or more phases in a solution via sedimentation, creaming or other such destabilization mechanisms. The test for phase separation in the context of the present invention is described below in the example section labeled "Determination of Particle Sedimentation" which is a test for phase separation for particle sedimentation.

"Aqueous system" herein refers to food, cosmetic, and pharmaceutical products in aqueous form which contain a suitable concentration of polyvalent cations or to which polyvalent cations can be added. Examples of liquid food products include, but are not limited to, drinks containing fruits, vegetables, or mixtures thereof, soups, salad dressings, and sauces. The drinks can be still or carbonated, consumed as is or to be diluted, sweetened or unsweetened, salted or unsalted, contain or not contain alcohol, or combinations thereof.

Examples of aqueous cosmetic products include, but are not limited to, perfumes, sun tan lotions, sun screen lotions, body lotions, deodorants, and antiperspirants. Examples of aqueous pharmaceutical products include, but are not limited to liquids, extracts, syrups, suspensions, liquors which contain active and/or inert ingredients either in solution or as a particle suspension or emulsion.

The pH of the aqueous system in the process of the present invention is preferably from about 2.5 to 5, and more preferably from about 3 to 5. The aqueous system can preferably have a solid content from about 0.1% to 50% by weight.

In one embodiment of the present invention, the aqueous system is a beverage drink that can have a solids content from about 0.1% to about 50% by weight, an alcohol content of between from about 0% to about 5% by volume, a salt (NaCl) content of about 0% to 3%, and a sugar content of from about 0.1% to about 15%.

The total amount of pectin in the aqueous system can preferably be from about 0.01% to about 0.3% by dry weight, and more preferably from about 0.1% to 0.2% by dry weight.

In addition, the low methoxyl pectin of the present invention can also be used in a composition. The composition contains the low methoxyl pectin of the present invention and an aqueous solution.

Also in accordance with the present invention, the low methoxyl pectin can be used in a stabilized aqueous system containing particles. The stabilized aqueous system containing particles includes the low methoxyl pectin of the present invention and polyvalent cations.

The low methoxyl pectin of the present invention has low viscosity and shear thinning properties, and thus does not have an undesirable organoleptic perception (pituitous or slimy mouth-feel). The pectin of the present invention also does not undergo syneresis (phase separation) upon storage or form a separate gel phase in the presence of relatively high levels of polycations such as magnesium and calcium ions.

When the low methoxyl pectin of the present invention is added to an aqueous system, it provides suspension of particles in the aqueous system. At the same time, it provides minimal changes in rheology during long term storage. Rheological evaluation of pectin solutions and beverages can be conducted using a Haake Rotovisco RV 20 and an RC 20 Rheocontroller computer interface or similar devices in the art, such as Rotational (Steady Shear) Software.

Suspension of particles in fluid or aqueous systems is the result of viscous or yield stress behavior. Yield stress behavior can be used to define rheology of a fluid, e.g., suspension of particles in aqueous systems by means of a weak gel network. Stokes Law can be used to calculate the settling rate of particles in viscous fluids. In the present invention, particle sedimentation is prevented by the formation of a weak gel network which keeps particles suspended. Factors which affect the rheology of pectins in solution include pH, soluble solids, calcium concentration, pectin type, temperature, fluid density, particle density and particle geometry. At a given set of conditions, the theological behavior associated with an aqueous system can be measured and calculated.

Yield stress ($\tau$) representing an elastic response can be defined with two equations:

$$\tau = \frac{rg(P_F - P_L)}{3}$$

derived from Stokes Law for particle settling, where
r=radius of particle
g=gravitational constant (980 cm/sec$^2$)
P$_F$=density of particle
P$_L$=density of liquid
and the equation:

$\tau = G' \cdot Y_c$    G' = elastic modulus, independent of strain
Y$_c$ = critical strain, where the network begins to lose its structure
and G' starts to decrease (loss of viscoelastic properties)

Therefore, when $$G' \cdot Y_c > \frac{rp(P_r - P_L)}{3},$$

the conditions are met for particles to stay suspended within the system.

G' and Y$_c$ are measured using a controlled stress or controlled rate rheometer and performing a dynamic strain sweep (for a given set of conditions) at a constant frequency. For a system exhibiting yield stress behavior, G" (viscous modulus) is smaller than G' in the linear region, independent of strain. Once the structure has been deformed at the critical strain, G" increases as the viscoelastic properties change and the system exhibits a trend toward viscous behavior (G" is larger than G').

FIG. 1 illustrates that the yield point can be determined from the linear plot of stress (Pa) as a function of shear rate ($s^{-1}$) by the Bingham extrapolation method. The yield point is the stress of extrapolated to a shear rate of zero. This point represents the behavior of an aqueous system at rest. The slope of the linear stress—shear rate curve is the fluid viscosity (Pa·sec).

For systems exhibiting viscous behavior, Stokes Law can be used to calculate the forces which act on a particle in a liquid system, at a given set of experimental conditions.

Stokes Law defines a friction coefficient for spheres as:

$$F = 6 \pi r \eta v$$

r = radius of particle
η = viscosity of liquid
v = velocity

This is used to calculate the viscous resistance encountered by a sphere moving through a liquid.

Gravitational forces act on a particle to pull it downward through the liquid, where:

$$F = \tfrac{4}{3} \pi r^3 (P_F - P_L) g$$

r = radius of particle
$P_F$ = density of particle
$P_L$ = density of liquid
g = gravitational constant When the viscous resistance is equal to the gravitational forces, the particle falls at a constant velocity.

$$6\pi r \eta v = \tfrac{4}{3}\pi r^3 (P_F - P_L) g$$

Solving for velocity, a settling rate can be calculated for a particle.

$$v = \frac{218 \; r^2 (P_r - P_L)}{\eta}$$

This is influenced by particle radius and liquid viscosity.

The viscosity needed for a particle to settle at a tolerable rate can be determined by the following formula:

$$\eta = \frac{218 \; r^2 (P_r - P_L)}{v}$$

Figure 2:
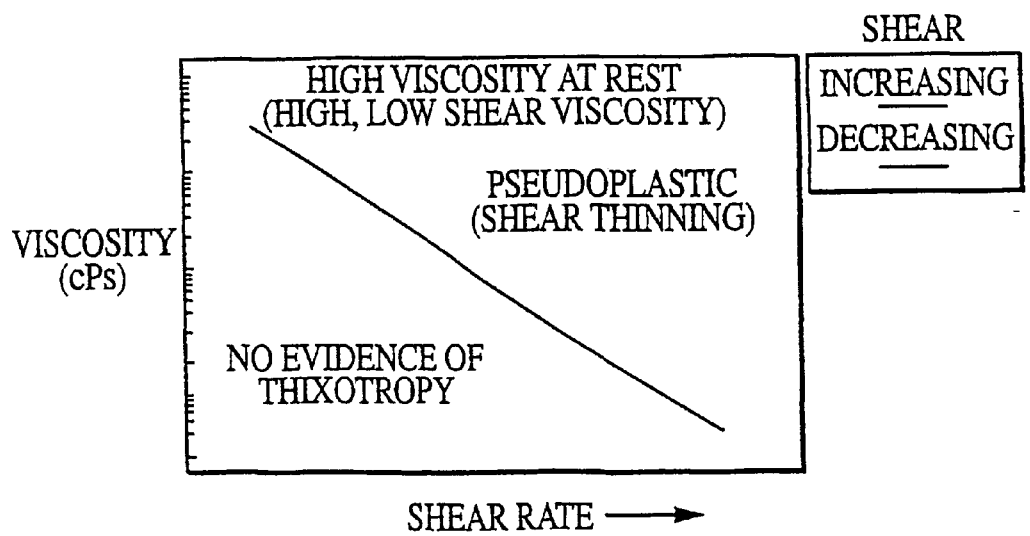
FIG. 2 is a linear plot of viscosity as a function of shear rate, which depicts idealized pseudoplatic behavior of a beverage system.

Ideally, the rheological behavior most desired for stabilization of particles in solution is pseudoplasticity. In this case, the solution is characterized by extremely high viscosity "at rest" (under conditions of zero shear) and low viscosity when shear is applied. In other words, the solution is "shear thinning." In addition, it is important that such a solution is able to rebuild viscosity or recover very quickly when shear is removed. Such solutions are said to be non-thixotropic. This is illustrated in FIG. 2.

Without further elaboration, it is believed that one skilled in the art can, using the preceding description, utilize the present invention to its fullest extent.

The following preferred specific embodiments are, therefore, to be construed as merely illustrative, and not limitative of the remainder of the disclosure in any way whatsoever.

EXAMPLES

Examples 1–39 provided below illustrate the different physical properties and rheology of different suspending aids including the LMP of the present invention. The methods for determining the physical properties and rheology of the suspending aids in the Examples 1–39 are shown below.

Analytical Procedures

Method for Determining CSPR (Ratio of CSP and NCSP in a Pectin Sample)

A pectin sample of 0.2 g is weighed to the nearest mg (in a pretared 50 ml centrifuge tube weighed to the nearest mg) and is dissolved in 10 g demineralized water by heating to the tube to 70° C. The solution is cooled to approximately 20° C. This is done in duplicate. The pH of each solution is adjusted to 4.0.

The total amount of pectin in the solution is determined by adding 20 ml of 80% isopropyl alcohol to one of the tubes to precipitate the pectin. The precipitate is collected by centrifugation at 30,000 G for 30 minutes, washed twice with 60% isopropyl alcohol following up each wash with centrifugation, dried at 60° C. over night under vacuum and weighed to the nearest mg. Calculate the amount of pectin precipitated and divide by the initial weight of pectin added to that particular tube. This ratio is designated the A value of the pectin.

10 ml of the following solution (which contains 60 mM calcium and 16 percent IPA) is added to the remaining 10 ml sample of pectin solution in a tared centrifuge tube:

387 g demineralized water
99 g 80% isopropyl alcohol (IPA)
4.4g $CaCl_2$, $2H_2O$ By mixing the two solutions, a Ca-content of 30 mM and 8% IPA is produced. The suspension of gel particles formed is left for 24 hours with occasional stirring. The gel particles are separated from the liquid phase by centrifugation at 30,000 G for 30 minutes. Gel particles are left in the tube after decant or siphon off the liquid phase.

The gel particles are washed twice in equal amounts of a solution containing 30 mM Ca and 8% IPA by vortexing and allowing the wash to equilibrate. The equilibration time is 24 hours for each washing. Following each wash the gel particles are separated using centrifugation at 30,000 G for 30 minutes. The washing solution for this step can be prepared by diluting an aliquot of the 16% IPA—60 mM calcium solution with an equal volume of water.

The total amount of washed gel phase is then weighed after decanting off the liquid phase. The amount of pectin in the gel phase is determined by mixing the gel phase, weighed out to the second decimal, with twice its value of 80% IPA and then washed twice in 60% IPA. The precipitate is collected by centrifugation at 30,000 G for 30 minutes after each wash. The sample is then dried at 60° C. over night under vacuum and weighed to the nearest mg. The normalized amount of CSP pectin is determined by dividing this amount of pectin by the original amount of pectin weighed into the centrifuge tube. This is designated the B value.

The ratio of CSP is calculated according to the formula:
CSPR=B/A

The ratio of NCSP is found by subtracting the CSPR value from 1.

Determination of the Calcium Sensitivity of a Pectin Sample

The method below is used to determine the calcium sensitivity of a pectin sample. The reagents used in this calculation are (1) 1.000 M HCl; (2) 1 M acetate buffer at pH 4.75 (68.04 g/l of 500 mM $CH_3COONa$ and $3H_2O$, and 28.6 ml/l of 500 mM $CH_3COOH$ (100%)); and (3) 250 mM calcium chloride (36.7550 g/l $CaCl_2$ and $2H_2O$). Ion exchanged water with a conductivity below 1.0 uS/cm must be used in all solutions. The pectin solution contains 400 g pectin solution with 2.4 g pure gum (0.6% sol.). If the testing sample is not 100% gum (pure gum), correct the sample using the following formula (A=the gum % of the sample):

(0.6×400)/A=g sample with A % gum for 400 g solution

The procedures for the calculating the calcium sensitivity are as follows: (1) weigh out the pectin with adjusted sugar percentage to 3 decimals; (2) disperse the pectin into 240 ml boiling ion-exchanged water in a high shear mixer; (3) pour the solution into a tared beaker with magnet; (4) pour additional 100 ml ion exchanged water into the mixer and add to the solution; (5) cool the pectin solution to about 25° C.; (6) adjust the pectin solution to a pH of 1.5 with 1 M HCl; (7) weigh the solution to 400 g; (8) weigh out 145 g±1 g pectin solution in a viscosity glass; (9) put a TRIKA magnet in the glass; (10) add 5 ml 250 mM $Ca^{++}$ solution to the pectin solution while stirring with the plate magnetic stirrer at step (1). Stir for 2 min; (11) add 25 ml 1 M acetate buffer with dispenser to the glass while stirring with a magnetic stirrer (JK IKA-Combimag REO) (the pH is about 4.2); (12) by means of the plate magnetic stirrer at step (1), stir for additional 2 minutes; (13) remove the magnet and let the solution rest at 25° C. until next day; and (14) measure calcium sensitivity as viscosity in cP with Brookfield LVT viscosimeter at 60 rpm. at 25° C. (use the thermostatically controlled water bath).

Determination of Degree of Esterification and Galacturonic Acid in Non-amide Pectin The degree of esterification (DE) and galacturonic acid (GA) in non-amide pectin can be determined as presented below. This method is a modification of the Food Chemicals Codex and Food and Agriculture Organization of the United Nations/World Health Organization method for determination of % DE and % GA in pectin which does not contain amide and acetate ester.

The apparatuses need to conduct this method include: an analytical balance; a glass beaker (250 ml, 5 PCS); a measuring glass (100 ml); a vacuum pump; a suction flask; a glass filter crucible no. 1 (Büchner funnel and filter paper); a stop watch; a test tube; a drying cabinet at 105° C.; a desiccator; a magnetic stirrer and magnets; a burette (10 ml, accuracy±0.05 ml); pipettes (20 ml: 2 PCS, 10 ml: 1 pc.); and a pH-meter/autoburette or phenolphtalein.

The chemicals required in this method include: carbon dioxide-free water; 60% and 100% isopropanol (IPA); 0.5 N and fuming 37% hydrochloride (HCl); 0.1 N and 0.5N sodium hydroxide (NaOH) (corrected to four decimals, e.g., 0.1002); 0.1 N silver nitrate 9 ($AgNO_3$); 3 N nitric acid ($NHO_3$); and indicator, 0.1% phenolphtalein (indicator).

The procedures for determining DE and GA are presented below. 2,000 g of pectin are weighed in a 250 ml glass beaker. 100 ml of acid alcohol are added and stirred on a magnetic stirrer for 10 minutes. The filtrate is throughly dried and the glass filter crucible is weighed. The beaker is completely rinsed with 6×15 ml acid alcohol. 60% IPA is washed until the filtrate is chloride-free (approximately 500 ml). The chloride test is conducted by transferring approximately 10 ml filtrate to a test tube, adding approximately 3 ml of 3 N $HNO_3$, and adding a few drops of $AgNO_3$. The filtrate is chloride-free if the solution is clear, otherwise there is a precipitation of silver chloride. 20 ml of 100% IPA is then washed. The sample is dried for 2½ hours at 105° C. The crucible is weighed after drying and cooling in a desiccator. 0.4000 g of the sample is accurately weighed in a 250 ml glass beaker. (Two samples are weighed for double determination.) The pectin is soaked with approximately 2 ml of 100% IPA and approximately 100 ml of carbon dioxide-free water are added while stirring on a magnetic stirrer.

The sample is then titrated, either by means of an indicator or by using a pH-meter/autoburette. If an indicator is used, the method is continued to be carried out as follows: add 5 drops of phenolphtalein indicator and titrate with 0.1 N NaOH until change of color (record it as $V_1$ titer); add 20.00 ml of 0.5 N NaOH while stirring; and allow the solution to stand for exactly 15 min. When standing, the sample must be covered with foil. 20.00 ml of 0.5 N HCl are then added and stirred on a magnetic stirrer until the color disappears. 3 drops of phenolphtalein are added and titrated with 0.1 N NaOH until change of color (record it as $V_2$ titer). The blind test (double determination) is then carried out as follows: add 5 drops phenolphtalein to 100 ml carbon dioxide-free water and titrate in a 250 ml glass beaker with 0.1 N NaOH until change of color (1–2 drops); then add 20.00 ml 0.5 N NaOH and let the sample stand untouched for exactly 15 minutes. When standing, the sample must be covered with foil. 20.00 ml of 0.5 N HCl and 3 drops phenolphtalein are then added and titrated until change of color with 0.1 N NaOH. The amount of 0.1 N NaOH used is recorded as $B_1$. The maximum amount allowed for titration is 1 ml of 0.1 N NaOH. If titrating with more than 1 ml, 0.5 N HCl must be diluted with a small amount of deionized water. If the sample shows a change of color with the addition of 0.5 N HCl, 0.5 N NaOH must be diluted with a small amount of deionized water. The maximum amount of water allowed to be used for is between 0.52 and 0.48 N.

If a pH-meter/autoburette is used, the method is continued to be carried out as follows: titrate each sample with 0.1 N NaOH to pH 8.5 (and the result is recorded as $V_1$, titer); then add 20.00 ml of 0.5 N NaOH and let the sample stand untouched for exactly 15 minutes. When standing the sample must be covered with foil. 20.00 ml of 0.5 N HCl are added and stirred on a magnetic stirrer until the pH is constant. The sample is then titrated with 0.1 N NaOH to pH 8.5. (The result is recorded as $V_2$ titer). The blind test (double determination) is carried out as follows: titrate 100 ml carbon dioxide-free water to pH 8.5 with 0.1 N NaOH (1–2 drops); add 20.00 ml of 0.5 N NaOH; and let the blind test sample stand untouched for exactly 15 minutes. When standing the sample must be covered with foil. 20.00 ml of 0.5 N HCl are added and stirred on a magnetic stirrer until pH is constant. The sample is then titrated to pH 8.5 with 0.1 N NaOH. The amount of 0.1 N NaOH used is recorded as $B_1$. The maximum amount allowed for titration is 1 ml of 0.1 N NaOH. If titrating with more than 1 ml, 0.5 N HCl must be diluted with a small amount of deionized water. If pH does not fall to below 8.5 on addition of 0.5 N HCl, 0.5 N NaOH must be diluted with a small amount of deionzed water. The maximum amount of water allowed to be used in the dilution is between 0.52 and 0.48 N.

The degree of esterification (DE), degree of free acid (DFA), and degree of galacturonic acid (GA) are calculated by the following formulas:

$$V_t = V_1 + (V_2 - B_1)$$

$$\% \text{ DE(Degree of esterification)} = \frac{(V_2 - B_1) \times 100}{V_1}$$

$$\% \text{D.F.A. (Degree of free acid)} = 100 - \% \text{ DE}$$

$$\% \text{ GA}^* \text{(Degree of galacturonic acid)} = \frac{194.1 \times V_t \times N \times 100}{400}$$

The percentage of GA is determined on ash and moisture-free basis. The value 194.1 is the molecular weight for GA.

"N" is the corrected normality for 0.1 N NaOH. used for titration (e.g., 0.1002 N). The value 400 refers to the weight in mg of washed and dried sample for titration.

Determination of Molecular Weight by Relative Viscosity

The procedure for calculating the molecular weight of the pectin is as follows: (1) clean the viscosimeters; (2) measure the outlet time on the viscosimeters for each freshly prepared hexametaphosphate solution and for every new working day where pectin solutions are being measured and immediately before measuring the necessary quantity of hexametaphosphate solution is filtered through a glass filter No. 3; (3) determine the pectin sample system as follows: (a) acid wash the pectin; (b) weigh approximately 90 g hexametaphosphate solution in a tared beaker with magnet; (c) gradually add 0.1 g acid washed pectin to the 90 g hexametaphosphate solution in a tared beaker while stirring; (d) heat the solution to 70° C. while stirring until the pectin is completely dissolved; (e) cool the solution to 25° C.; (f) q.s. (weigh up) to 100.0 g with hexametaphosphate solution; and (g) filter through a glass filter No. 3; (4) measure the outlet time for every molecular weight determination on two different viscosimeters; and (5) calculate the molecular weight separately for each viscosimeter using the latest measured outlet time for hexametaphosphate solution on the viscosimeter in question. If the difference between two calculated molecular weights is less than 3,500, the mean value is calculated by rounding off the value to the nearest multiple of 1,000. If the difference between the two calculated molecular weights is 3,500 or more, clean the viscosimeters and measure a new outlet time for hexametaphosphate solution.

The outlet time is measured by the conducting the following procedure: (1) rinse the viscosimeter twice with the sample; (2) pour 5.00 ml of the sample in the viscosimeter and place it in the thermostated water bath at 25.0° C.±0.3° C. at least 15 minutes prior to measuring; and (3) measure time on the two outlets. If the difference between the times is more than 0.2 seconds on measuring hexametaphosphate solution or 0.4 seconds on measuring samples, the measuring is repeated until there are three outlet times which differ no more than 0.2 seconds on measuring hexametaphosphate solution or 0.4 seconds on measuring samples. The outlet time which is needed for further calculations is the mean value of the above mentioned two or three identical or almost identical measuring results.

The relative viscosity is calculated as follows:

$$n_r = (t_o - K/t_o)/(t_h - K/t_h)$$

wherein $t_o$ and $t_h$ are the outlet times for pectin solution and hexametaphosphate solution, respectively, wherein $K=(Q \times t^2_v)/(Q+(0.226 \cdot L \cdot t_v))$, and wherein Q=volume of viscosimeter bulb in cm$^3$, L=length of capillary tube in cm and $t_v$=outlet time for water in seconds.

The molecular weight of pectin is then calculated as follows:

$$M = 1.277 \cdot 10^6 (n_r^{1/6} - 1) \text{ g/mol}$$

Determination of Particle Sedimentation

Particle sedimentation is evaluated by placing samples of commercially available juice based beverages which contain insoluble particles to which the test pectins are added, into 15 cm high screw capped tubes which have outside diameters (OD) of 16 mm. Examples of such beverages include Frutopia Strawberry Passion, Libby Juicy Juice, Ocean Spray Orange Juice, Ocean Spray Ruby Red Grapefruit Juice, Snapple Island Cocktail, and Tropicana Twister.

Solutions of the test pectins (2% w/w) are prepared and added to the beverages to achieve a final concentration of 0.1 wt. %. The tubes are allowed to stand refrigerated at 3° C. for four weeks. At that point, the height of the clear liquid column above the particle suspension is measured. A percent sedimentation is calculated by dividing the height of the clear layer ($H_C$) by the total height ($H_T$) of the liquid in the tube (clear layer+pulp suspended) as shown below:

$$(H_C/H_T) \times 100$$

Preparation of a Synthetic Beverage

The following formula is used to prepare samples for the rheological and pulp suspension experiments. The ingredients are listed in order of addition.

TABLE A

| Ingredient | Amount |
| --- | --- |
| Deionized water | 166.97 g |
| Test pectin or xanthan | 0.2 g |
| Sucrose | 24 g |
| Calcium(1) | 8.33 ml |
| Citric acid(2) | 0.5 g |

(2)50% citric acid stock solution

In Table A, (1) refers to 6000 ppm stock solution prepared with $CaCl_2 \cdot 2H_2O$ and (2) refers to 50% citric acid stock solution.

The procedure for preparing the synthetic beverage includes heating water to 90° C.; adding pectin slowly to hot water while mixing with Silverson mixer; adding sugar to the mixture while mixing; and adding calcium solution to the mixture while mixing; adjusting the pH of the solution to 3.0 with additional citric acid as needed; pouring hot solution into suitable container; cooling the solution to room temperature; and refrigerating as needed.

Determination of Viscosity and Yield Point (Rheological Evaluation)

A synthetic beverage solution is used to determine the viscosity and yield point (rheological properties) of the pectin in solution.

Rheological evaluation of pectins in a synthetic beverage system are conducted using a Haake Rotovisco RV 20 and an RC 20 Rheocontroller computer interface. For these samples, the Rotational (Steady Shear) Software is used.

The program is a time-linear flow curve (tau/D), which ramps the shear rate up and down, over a defined time interval. The shear rate to be reached over a time interval and the number of data points to be collected are defined in this program. The slope of the curve corresponds to the shear rate difference divided by the ramp time.

The flow curve program parameters are as follows:

| Segment Type | Shear Rate (1/s) | Time (sec) | Temp (° C.) | Data Points |
| --- | --- | --- | --- | --- |
| Start | 0.00 | 30 | 25 | 5 |
| Tau/D | 0.5 | 30 | 25 | 5 |
| Tau/D | 1.0 | 30 | 25 | 5 |
| Tau/D | 5.0 | 30 | 25 | 5 |
| Tau/D | 10.0 | 30 | 25 | 5 |
| Tau/D | 50.0 | 30 | 25 | 5 |
| Tau/D | 100.0 | 30 | 25 | 5 |
| Tau/D | 200.0 | 30 | 25 | 5 |
| Tau/D | 300.0 | 30 | 25 | 5 |
| Tau/t(time) | 300.0 | 30 | 25 | 0 |

-continued

| Segment Type | Shear Rate (1/s) | Time (sec) | Temp (° C.) | Data Points |
|---|---|---|---|---|
| Tau/D | 200.0 | 30 | 25 | 5 |
| Tau/D | 100.0 | 30 | 25 | 5 |
| Tau/D | 50.0 | 30 | 25 | 5 |
| Tau/D | 10.0 | 30 | 25 | 5 |
| Tau/D | 5.0 | 30 | 25 | 5 |
| Tau/D | 1.0 | 30 | 25 | 5 |
| Tau/D | 0.5 | 30 | 25 | 5 |
| Tau/D | 0.0 | 30 | 25 | 5 |

The shear rate is ramped upward to 300 1/s over fixed time intervals. The sample is then sheared for 30 seconds at 300 1/s and ramped downward using the same intervals.

Plotting stress vs. strain rate linearly allows one to extrapolate to the y-intercept and obtain a yield point or yield stress value, which can then be used to satisfy the yield stress equation for particle suspension. Viscosity is calculated from the equation:

$$\eta = \tau/Y$$

A Bingham regression is a linear regression with the equation:

$$J = J_0 + eta \cdot Y (y = mx + b)$$

The $J_0$ (yield point) and eta (slope) values are necessary for data interpretation.

When stress (Pa) is ploted as a function of shear rate (1/sec), a plot like that shown in the FIG. 1. From this data both yield point (stress extrapolated to a zero shear rate) and viscosity at any desired shear rate (the slope of the curve at the indicated shear rate, i.e., Pa sec) can be determined.

Example 1

Control Example

In this example, pectin is extracted from lemon peel and then fractionating the pectin to obtain NCSP precursor.

10 kg of dried lemon peel (Argentina) is added to a 500 liter stirred tank reactor. 500 liters of deionized water is then added to the peel in the reactor. 0.8 liter of nitric acid (62 wt. % $HNO_3$, Olin Corp., Chemicals Group, Norwalk, Conn. 06856 USA) is further added to the reactor to reach a pH of 0.9 to 1.2.

Pectin is extracted from the mixture of lemon peel by heating the mixture with slight agitation to 70° C. for 3 hours. The extraction mixture is then filtered using vacuum filtration followed by a vacuum polishing filtration using Celite (Celite Corp., c/o World Minerals Inc. Lompoc, Calif. 93438 USA).

The filtrate is evaporated using a wiped film evaporator to increase the pectin concentration in solution to approximately 1.6% w/w. The pH of the clear filtrate is adjusted to 4.0 by the addition of a sodium carbonate solution ($Na_2CO_3$, CERAC, Inc. Milwaukee, Wis. 53201 1178 USA).

1000 Kg of the 1.6% pectin thick juice is then mixed with 1500 Kg of IPA/calcium solution to produce a mixture composition of 0.9% (w/w) pectin, 6.8% (w/w) IPA and 2,000 ppm calcium at pH 4.0. This mixture is allowed to gel. The gel particles are separated form the liquid portion using screens to hold the gel but allow the liquid to pass through. The gel phase contains the CSP fraction. The liquid phase contains the desired NCSP fraction. The gels are washed over a series of 4 screens with IPA/Calcium mixture in a counter-current fashion. After washing is completed, the liquid phase is concentrated by evaporation, calcium is removed by ion exchange. Optionally, the dry NCSP precursor is isolated by precipitation with 2 volumes of 60% IPA. In this case, the pectin is belt pressed. The pressed pectin is dried and ground.

Molecular weight, degree of esterification, calcium sensitivity, ratio of calcium sensitivity, and carboxyl distribution of the initial pectin, CSP fraction, and NCSP fraction are calculated using known techniques in the art. The results of this example are shown in Table 1 below.

TABLE 1

|  | Initial Pectin | CSP | NCSP |
|---|---|---|---|
| Molecular Weight (1,000 Daltons) | 115–130 | 125–140 | 100–115 |
| Degree of Esterification (%) | 68–72 | 65–68 | 75–77 |
| Calcium Sensitivity (Cps.) | 150–300 | 600–1000 | <10 |
| Calcium Sensitive Pectin Ratio | 60 | 95+ | <5 |
| Carboxyl Distribution | Mixture | Blocky | Random |

Examples 2 to 19 provided below illustrate the different physical properties and rheology of different suspending aids and the LMP of the present invention. Specifically, Example 2 is directed to xanthan. Examples 3 and 4 are directed to control examples prepared by extracting pectin from lemon peel and then fractionating the pectin to obtain NCSP precursor. Examples 5 to 14 illustrate the preparation of the low methoxyl amidated pectin of the present invention by deesterification and amidation with ammonia. Examples 11 to 14 are directed to amidated pectins (prepared by deesterification and amidation) known in the art. Examples 15 and 16 illustrate the preparation of the low methoxyl pectin of the present invention by deesterifying NCSP with acid. Examples 17 to 19 are directed to conventional pectins (prepared by deesterification) known in the art.

The degree of esterification, degree of amidation, molecular weight, phase separation, particle sedimentation, and viscosity at different levels of the resulting products of Examples 2 to 19, as well as Example 1 (Control Example) are determined using known techniques in the art. The Rheology evaluation of Examples 1 to 19 is conducted using a Haake Rotovisco RV 20 and an RC 20 Rheocontroller computer interface, i.e., Rotational (Steady Shear) Software. The results of Examples 1 to 19 are shown in Table 2 below.

Example 2

Xanthan

Comparative Example

Keltrol® xanthan, manufactured by NutraSweet Company (500 W. Madison, Suite 3180, Chicago, Ill. 60661) was obtained and used in this example to evaluate the phase separation, particle sedimentation, and viscosity of xanthan.

Example 3

Control Example

This example is prepared using the same procedures described in Example 1 to obtain NCSP precursor. Specifically, 10 kg of dried lemon peel (Argentina) is added to a 500 liter stirred tank reactor. 500 liters of deionized water is then added to the peel in the reactor. 0.8 liter of nitric acid (62 wt. % $HNO_3$, Olin Corp., Chemicals Group, Norwalk, Conn. 06856 USA) is further added to the reactor to reach a pH of 0.9 to 1.2.

Pectin is extracted from the mixture of lemon peel by heating the mixture with slight agitation to 70° C. for 3 hours. The extraction mixture is then filtered using vacuum filtration followed by a vacuum polishing filtration using Celite (Celite Corp., c/o World Minerals Inc. Lompoc, Calif. 93438 USA).

The filtrate is evaporated using a wiped film evaporator to increase the pectin concentration in solution to approximately 1.6% w/w. The pH of the clear filtrate is adjusted to 4.0 by the addition of a sodium carbonate solution ($Na_2CO_3$, CERAC, Inc. Milwaukee, Wis. 53201 1178 USA).

1000 Kg of the 1.6% pectin thick juice is then mixed with 1500 Kg of IPA/calcium solution to produce a mixture composition of 0.9% (w/w) pectin, 6.8% (w/w) IPA and 2,000 ppm calcium at pH 4.0. This mixture is allowed to gel. The gel particles are separated form the liquid portion using screens to hold the gel but allow the liquid to pass through. The gel phase contains the CSP fraction. The liquid phase contains the desired NCSP fraction. The gels are washed over a series of 4 screens with IPA/Calcium mixture in a counter-current fashion. After washing is completed, the liquid phase is concentrated by evaporation, calcium is removed by ion exchange. Optionally, the dry NCSP precursor is isolated by precipitation with 2 volumes of 60% IPA. In this case, the pectin is belt pressed. The pressed pectin is dried and ground.

Example 4

Control Example

This example is prepared using the same procedures described in Example 1 to obtain NCSP precursor.

10 kg of dried lemon peel (Argentina) is added to a 500 liter stirred tank reactor. 500 liters of deionized water is then added to the peel in the reactor. 0.8 liter of nitric acid (62 wt. % $HNO_3$, Olin Corp., Chemicals Group, Norwalk, Conn. 06856 USA) is further added to the reactor to reach a pH of 0.9 to 1.2.

Pectin is extracted from the mixture of lemon peel by heating the mixture with slight agitation to 70° C. for 3 hours. The extraction mixture is then filtered using vacuum filtration followed by a vacuum polishing filtration using Celite (Celite Corp., c/o World Minerals Inc. Lompoc, Calif. 93438 USA).

The filtrate is evaporated using a wiped film evaporator to increase the pectin concentration in solution to approximately 1.6% w/w. The pH of the clear filtrate is adjusted to 4.0 by the addition of a sodium carbonate solution ($Na_2CO_3$, CERAC, Inc. Milwaukee, Wis. 53201 1178 USA).

1000 Kg of the 1.6% pectin thick juice is then mixed with 1500 Kg of IPA/calcium solution to produce a mixture composition of 0.9% (w/w) pectin, 6.8% (w/w) IPA and 2,000 ppm calcium at pH 4.0. This mixture is allowed to gel. The gel particles are separated form the liquid portion using screens to hold the gel but allow the liquid to pass through. The gel phase contains the CSP fraction. The liquid phase contains the desired NCSP fraction. The gels are washed over a series of 4 screens with IPA/Calcium mixture in a counter-current fashion. After washing is completed, the liquid phase is concentrated by evaporation, calcium is removed by ion exchange. Optionally, the dry NCSP precursor is isolated by precipitation with 2 volumes of 60% IPA. In this case, the pectin is belt pressed. The pressed pectin is dried and ground.

Example 5

Low Methoxyl Amidated Pectin of the Present Invention

Prepared by Deesterification and Amidation

Suspend 200 g of dry NCSP precursor of Example 1 in 1 liter of 70/30 IPA/$H_2O$ with mixing. The mixture is cooled to 5° C. using a thermometer placed in the reaction mixture. Add 140 grams of $NH_4OH$ (ammonia water, stronger, Baker Chemical, 28–29%) in one batch. Allow the pH to stabilize for 5 minutes. The pH is 12.1. Set the pH controller to hold the pH to within ±0.2 pH units of this pH by controlled addition of $NH_4OH$. The reaction is allowed to continue for 1 hour over which time an additional 4.5 grams of $NH_4OH$ is consumed. Ten minutes before the end of the reaction, the agitator is turned off to allow the pectin to settle. The supernatant layer is withdrawn with a vacuum.

One liter of acidified 60/40 IPA/$H_2O$(pH of 60/40 IPA/$H_2O$ is adjusted to 1.5–2.0 with $HNO_3$, Baker Chemical, 69–70%) is added to the reactor and the agitator is restarted. Add additional $HNO_3$ to adjust pH to 3.3–3.6. Allow to mix for 1 hour. Remove the mixture with a vacuum. Filter the mixture on a course frit filter. Wash pectin on the filter with 300–500 ml. 70/30 IPA/$H_2O$ for 15 minutes, stirring occasionally (IPA, 99%, HCl East Falls Corporation). Filter on a course frit filter.

Repeat the steps of washing and filtering the pectin two additional times with fresh 70/30 IPA/$H_2O$ wash. Stir each wash on the filter occasionally for 5 minutes. Remove pectin to glass evaporating dish (not aluminum pan). Dry the pectin overnight at 50° C., or over weekend at room temperature in the hood followed by 50° C for 3 hrs.

Example 6

Low Methoxyl Amidated Pectin of the Present Invention

Prepared by Deesterification and Amidation

Suspend 200 g of dry NCSP precursor of Example 1 in 1 liter of 70/30 IPA/$H_2O$ with mixing. The mixture is cooled to 5° C. using a thermometer placed in the reaction mixture. Add 140 grams of $NH_4OH$ (ammonia water, stronger, Baker Chemical, 28–29%) in one batch. Allow the pH to stabilize for 5 minutes. The pH is 12.1. Set the pH controller to hold the pH to within ±0.2 pH units of this pH by controlled addition of $NH_4OH$. The reaction is allowed to continue for 1 hour over which time an additional 38.2 grams of $NH_4OH$ is consumed. Ten minutes before the end of the reaction, the agitator is turned off to allow the pectin to settle. The supernatant layer is withdrawn with a vacuum.

One liter of acidified 60/40 IPA/$H_2O$(pH of 60/40 IPA/$H_2O$ is adjusted to 1.5–2.0 with $HNO_3$, Baker Chemical, 69–70%) is added to the reactor and the agitator is restarted. Add additional $HNO_3$ to adjust pH to 3.3–3.6. Allow to mix for 1 hour. Remove the mixture with a vacuum. Filter the mixture on a course frit filter. Wash pectin on the filter with 300–500 ml. 70/30 IPA/$H_2O$ for 15 minutes, stirring occasionally (IPA, 99%, HCl East Falls Corporation). Filter on a course frit filter.

Repeat the steps of washing and filtering the pectin two additional times with fresh 70/30 IPA/$H_2O$ wash. Stir each wash on the filter occasionally for 5 minutes. Remove pectin to glass evaporating dish (not aluminum pan). Dry the pectin overnight at 50° C., or over weekend at room temperature in the hood followed by 50° C. for 3 hrs.

Example 7

Low Methoxyl Amidated Pectin of the Present Invention

Prepared by Deesterification and Amidation

Suspend 200 g of dry NCSP precursor of Example 1 in 1 liter of 70/30 IPA/$H_2O$ with mixing. The mixture is cooled to 5° C. using a thermometer placed in the reaction mixture. Add 140 grams of $NH_4OH$ (ammonia water, stronger, Baker Chemical, 28–29%) in one batch. Allow the pH to stabilize for 5 minutes. The pH is 12.1. Set the pH controller to hold the pH to within ±0.2 pH units of this pH by controlled addition of $NH_4OH$. The reaction is allowed to continue for 1 hour over which time an additional 3.0 grams of $NH_4OH$ is consumed. Ten minutes before the end of the reaction, the agitator is turned off to allow the pectin to settle. The supernatant layer is withdrawn with a vacuum.

One liter of acidified 60/40 IPA/$H_2O$ (pH of 60/40 IPA/$H_2O$ is adjusted to 1.5–2.0 with $HNO_3$, Baker Chemical, 69–70%) is added to the reactor and the agitator is restarted. Add additional $HNO_3$ to adjust pH to 3.3–3.6. Allow to mix for 1 hour. Remove the mixture with a vacuum. Filter the mixture on a course frit filter. Wash pectin on the filter with 300–500 ml. 70/30 IPA/$H_2O$ for 15 minutes, stirring occasionally (IPA, 99%, HCl East Falls Corporation). Filter on a course frit filter.

Repeat the steps of washing and filtering the pectin two additional times with fresh 70/30 IPA/$H_2O$ wash. Stir each wash on the filter occasionally for 5 minutes. Remove pectin to glass evaporating dish (not aluminum pan). Dry the pectin overnight at 50° C., or over weekend at room temperature in the hood followed by 50° C. for 3 hrs.

Example 8

Low Methoxyl Amidated Pectin of the Present Invention

Prepared by Deesterification and Amidation

Suspend 200 g of dry NCSP precursor of Example 1 in 1 liter of 70/30 IPA/$H_2O$ with mixing. The mixture is cooled to 5° C. using a thermometer is placed in the reaction mixture. Add 180 grams of $NH_4OH$ (ammonia water, stronger, Baker Chemical, 28–29%) in one batch. Allow the pH to stabilize for 5 minutes. The pH is 11.95. Set the pH controller to hold the pH to within ±0.2 pH units by controlled addition of $NH_4OH$. The reaction is allowed to continue for 3 hours over which time an additional 54.7 grams of $NH_4OH$ is consumed. Ten minutes before the end of the reaction, the agitator is turned off to allow the pectin to settle. The supernatant layer is withdrawn with a vacuum.

One liter of acidified 60/40 IPA/$H_2O$ (pH of 60/40 IPA/$H_2O$ is adjusted to 1.5–2.0 with $HNO_3$, Baker Chemical, 69–70%) is added to the reactor and the agitator is restarted. Add additional $HNO_3$ to adjust pH to 3.3–3.6. Allow to mix for 1 hour. Remove the mixture with a vacuum. Filter the mixture on a course frit filter. Wash pectin on the filter with 300–500 ml. 70/30 IPA/$H_2O$ for 15 minutes, stirring occasionally (IPA, 99%, HCl East Falls Corporation). Filter on a course frit filter.

Repeat the steps of washing and filtering the pectin two additional times with fresh 70/30 IPA/$H_2O$ wash. Stir each wash on the filter occasionally for 5 minutes. Remove pectin to glass evaporating dish (not aluminum pan). Dry the pectin overnight at 50° C., or over weekend at room temperature in the hood followed by 50° C. for 3 hrs.

Example 9

Low Methoxyl Amidated Pectin of the Present Invention

Prepared by Deesterification and Amidation

Suspend 200 g of dry NCSP precursor of Example 1 in 1 liter of 70/30 IPA/$H_2O$ with mixing. The mixture is cooled to 5° C. using a thermometer placed in the reaction mixture. Add 160 grams of $NH_4OH$ (ammonia water, stronger, Baker Chemical, 28–29%) in one batch. Allow the pH to stabilize for 5 minutes to 11.45. Set the pH controller to hold the pH to within +/−0.2 pH units by controlled addition of $NH_4OH$. The reaction is allowed to continue for 4 hours over which time an additional 1044 grams of $NH_4OH$ is consumed. Ten minutes before the end of the reaction, the agitator is turned off to allow the pectin to settle. The supernatant layer is withdrawn with a vacuum.

One liter of acidified 60/40 IPA/$H_2O$ (pH of 60/40 IPA/$H_2O$ is adjusted to 1.5–2.0 with $HNO_3$, Baker Chemical, 69–70%) is added to the reactor and the agitator is restarted. Add additional $HNO_3$ to adjust pH to 3.3–3.6. Allow to mix for 1 hour. Remove the mixture with a vacuum. Filter the mixture on a course frit filter. Wash pectin on the filter with 300–500 ml. 70/30 IPA/$H_2O$ for 15 minutes, stirring occasionally (IPA, 99%, HCl East Falls Corporation). Filter on a course frit filter.

Repeat the steps of washing and filtering the pectin two additional times with fresh 70/30 IPA/$H_2O$ wash. Stir each wash on the filter occasionally for 5 minutes. Remove pectin to glass evaporating dish (not aluminum pan). Dry the pectin overnight at 50° C., or over weekend at room temperature in the hood followed by 50° C. for 3 hrs.

Example 10

Low Methoxyl Amidated Pectin of the Present Invention

Prepared by Deesterification and Amidation

Suspend 200 g of dry NCSP precursor of Example 1 in 1 liter of 70/30 IPA/$H_2O$ with mixing. The mixture is cooled to 5° C. using a thermometer placed in the reaction mixture. Add 180 grams of $NH_4OH$ (ammonia water, stronger, Baker Chemical, 28–29%) in one batch. Allow the pH to stabilize for 5 minutes. The pH is 11.45. Set the pH controller to hold the pH to within +/−0.2 pH units by controlled addition of $NH_4OH$. The reaction is allowed to continue for 3 hours over which time an additional 36.4 grams of $NH_4OH$ is consumed. Ten minutes before the end of the reaction, the agitator is turned off to allow the pectin to settle. The supernatant layer is withdrawn with a vacuum.

One liter of acidified 60/40 IPA/$H_2O$ (pH of 60/40 IPA/$H_2O$ is adjusted to 1.5–2.0 with $HNO_3$, Baker Chemical, 69–70%) is added to the reactor and the agitator is restarted. Add additional $HNO_3$ to adjust pH to 3.3–3.6. Allow to mix for 1 hour. Remove the mixture with a vacuum. Filter the mixture on a course frit filter. Wash pectin on the filter with 300–500 ml. 70/30 IPA/$H_2O$ for 15 minutes, stirring occasionally (IPA, 99%, HCl East Falls Corporation). Filter on a course frit filter.

Repeat the steps of washing and filtering the pectin two additional times with fresh 70/30 IPA/$H_2O$ wash. Stir each wash on the filter occasionally for 5 minutes. Remove pectin to glass evaporating dish (not aluminum pan). Dry the pectin overnight at 50° C., or over weekend at room temperature in the hood followed by 50° C. for 3 hrs.

Example 11

Low Methoxyl Amidated Pectin Known in the Art

Prepared by Deesterification and Amidation

LMA pectin, Genu pectin Type LM 101 AS manufactured by Hercules Incorporated (Wilmington, Del.), is used in this example to evaluate the degree of esterification, degree of amidation, molecular weight, phase separation, particle sedimentation, and viscosity of the LMA pectin.

Example 12

Low Methoxyl Amidated Pectin Known in the Art

Prepared by Deesterification and Amidation

LMA pectin, Genu pectin Type LM 102AS manufactured by Hercules Incorporated (Wilmington, Del.), is used in this example to evaluate the degree of esterification, degree of amidation, molecular weight, phase separation, particle sedimentation, and viscosity of the LMA pectin.

Example 13

Low Methoxyl Amidated Pectin Known in the Art

Prepared by Deesterification and Amidation

LMA pectin, Genu pectin Type LM 103AS manufactured by Hercules Incorporated (Wilmington, Del.), is used in this example to evaluate the degree of esterification, degree of amidation, molecular weight, phase separation, particle sedimentation, and viscosity of the LMA pectin.

Example 14

Low Methoxyl Amidated Pectin Known in the Art

Prepared by Deesterification and Amidation

LMA pectin, Genu pectin Type LM 104AS manufactured by Hercules Incorporated (Wilmington, Del.), is used in this example to evaluate the degree of esterification, degree of amidation, molecular weight, phase separation, particle sedimentation, and viscosity of the LMA pectin.

Example 15

Low Methoxyl Conventional (LMC) Pectin of the Present Invention

Prepared by Deesterification 200 grams of dried NCSP precursor of Example 1 is dissolved in 10 liters of water. The temperature of the pectin solution is adjusted to 50° C. This temperature is maintained for the duration of the reaction. The pH of the pectin solution is adjusted to 1.0 by the addition of nitric acid (62 wt. % $HNO_3$ manufactured by Olin Corp., Chemicals Group, Norwalk, Conn.). This solution is maintained at 50° C. for 10 hours. No additional acid is added during the course of the reaction.

The low methoxy pectin is then isolated from the solution by adding the pectin solution to 20 liters of 60% isopropyl alcohol (IPA). The pectin precipitate is pressed on a band press to remove excess water and IPA. The pectin press cake is resuspended in an additional 20 liters of IPA and mixed. To this mixture, a solution of 1 kg of sodium carbonate ($Na_2CO_3$ manufactured by Cerac Inc., Milwaukee, Wis.) to 4 parts water is added in sufficient quantity to achieve a pH of the mixture of 5.0 or a final pectin pH of 3.5 when measured in a 1% aqueous solution. The neutralized pectin is then belt pressed. The pressed pectin is dried and ground to powder.

Example 16

Low Methoxyl Conventional (LMC) Pectin of the Present Invention

Prepared by Deesterification

This example is prepared using the same procedure as described in Example 15 with the exception that the solution is mainted at 50° C. for 15 hours instead of 10 hours.

Example 17

Low Methoxyl Conventional (LMC) Pectin Known in the Art

Prepared by Deesterification

LMC pectin, Genu pectin Type LM 12 CG manufactured by Hercules Incorporated (Wilmington, Del.), is used in this example to evaluate the degree of esterification, degree of amidation, molecular weight, phase separation, particle sedimentation, and viscosity of the LMA pectin.

Example 18

Low Methoxyl Conventional (LMC) Pectin Known in the Art

Prepared by Deesterification

LMC pectin, Genu pectin Type LM 18 CG manufactured by Hercules Incorporated (Wilmington, Del.), is used in this example to evaluate the degree of esterification, degree of amidation, molecular weight, phase separation, particle sedimentation, and viscosity of the LMA pectin.

Example 19

Low Methoxyl Conventional (LMC) Pectin Known in the Art

Prepared by Deesterification

LMC pectin, Genu pectin Type LM 22 CG manufactured by Hercules Incorporated (Wilmington, Del.), is used in this example to evaluate the degree of esterification, degree of amidation, molecular weight, phase separation, particle sedimentation, and viscosity of the LMA pectin.

TABLE 2

| Example No. | DE (%) | DA (%) | Rel Visc. Mw (kDa) | Gel Contraction | Target Rheology Vs. Calcium Level | | Viscosity(Cps.) At Shear Rates | | |
|---|---|---|---|---|---|---|---|---|---|
| | | | | | 300 ppm | 150 ppm | *at rest* (0.04 s$^{-1}$) | 0.1 s* | 1 s$^{-1}$ |
| 1 | | | | – | | | | | |
| 2 | | | | – | +++ | +++ | 900 | 300 | 100 |
| 3 | 77.4 | 0.0 | 113.0 | – | – | – | | | |

TABLE 2-continued

| Example No. | DE (%) | DA (%) | Rel Visc. Mw (kDa) | Gel Contraction | Target Rheology Vs. Calcium Level 300 ppm | 150 ppm | Viscosity(Cps.) At Shear Rates *at rest* ($0.04\ s^{-1}$) | $0.1\ s^{-1}$ | $1\ s^{-1}$ |
|---|---|---|---|---|---|---|---|---|---|
| 4 | 76.7 | 0.0 | 94.4 | − | − | − | | | |
| 5 | 62.9 | 9.3 | 91.2 | − | ++ | − | 200 | 100 | 10 |
| 6 | 51.3 | 20.8 | 87.2 | − | +++ | − | 400 | 90 | 25 |
| 7 | 40.9 | 4.7 | 84.6 | + | +++ | +++ | 500 | 200 | 35 |
| 8 | 29.7 | 13.3 | 85.4 | ++ | + | | | | |
| 9 | 20.8 | 27.7 | 81.2 | ++ | + | | | | |
| 10 | 12.4 | 37.5 | 80.7 | +++ | − | | | | |
| 11 | 35 | 15 | 90.0 | +++ | +++ | +++ | 1500 | 1300 | 90 |
| 12 | 32 | 17 | 90.0 | | − | − | | | 20 |
| 13 | 48 | 7 | 90.0 | | − | − | | | 70 |
| 14 | 30 | 20 | 90.0 | ++ | ++ | + | | 580 | 50 |
| 15 | 40.2 | 0.0 | | − | +++ | +++ | 800 | 500 | 90 |
| 16 | 23.5 | 0.0 | | + | + | +++ | 1800 | 1100 | 300 |
| 17 | 30 | 0.0 | 65.0 | +++ | + | − | 600 | 80 | 15 |
| 18 | 40 | 0.0 | 75.0 | +++ | +++ | + | 1100 | 800 | 60 |
| 19 | 50 | 0.0 | 90.0 | | − | − | | | |

As shown in Table 2, the low methoxyl amidated pectins and the low methoxyl conventional (LMC) pectins of the present invention have properties and rheology similar to xanthan. Several of the commercially available LMA and LMC types show rheological behavior consistent with the idealized target and xanthan, but result in phase separation, gel contraction or form a weak gel mass.

Figure 3:
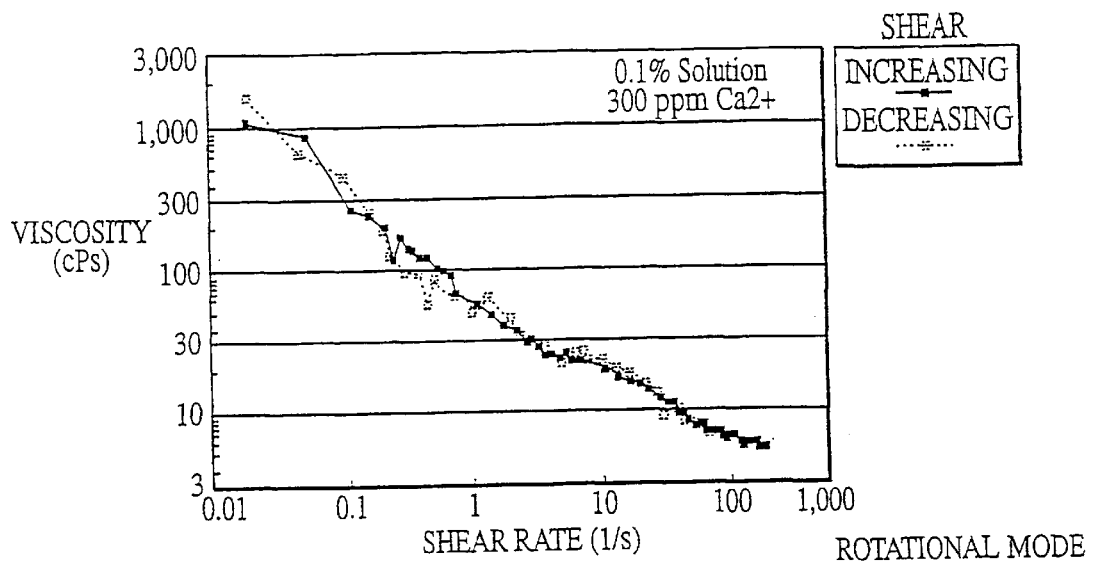
FIG. 3 depicts the linear plot of stress as a function of shear rate of the pectin of the present invention as shown in Example 15.
Figure 4:
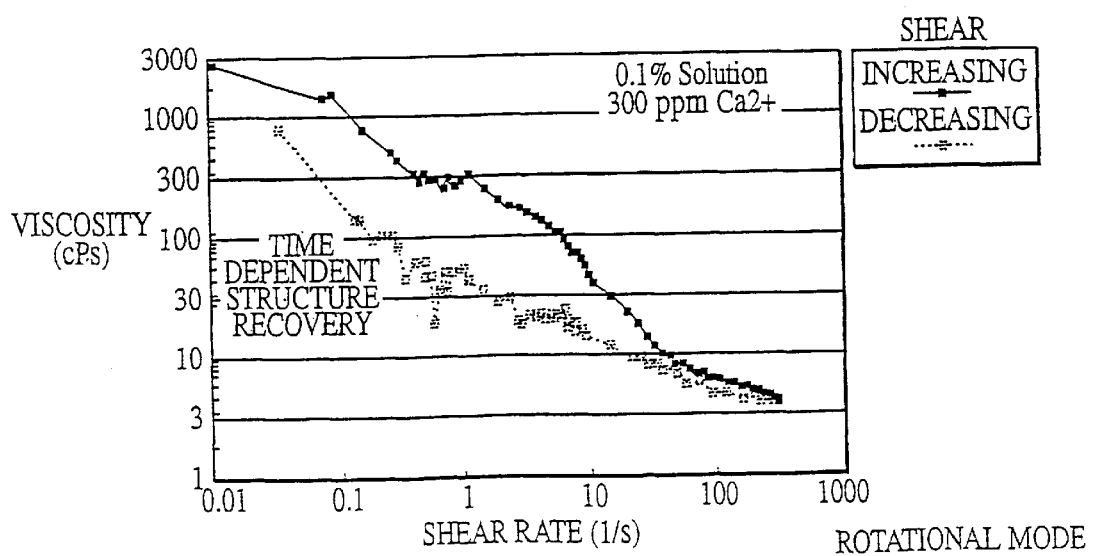
FIG. 4 depicts the linear plot of stress as a function of shear rate of the pectin of the present invention as shown in Example 16.
Figure 5:
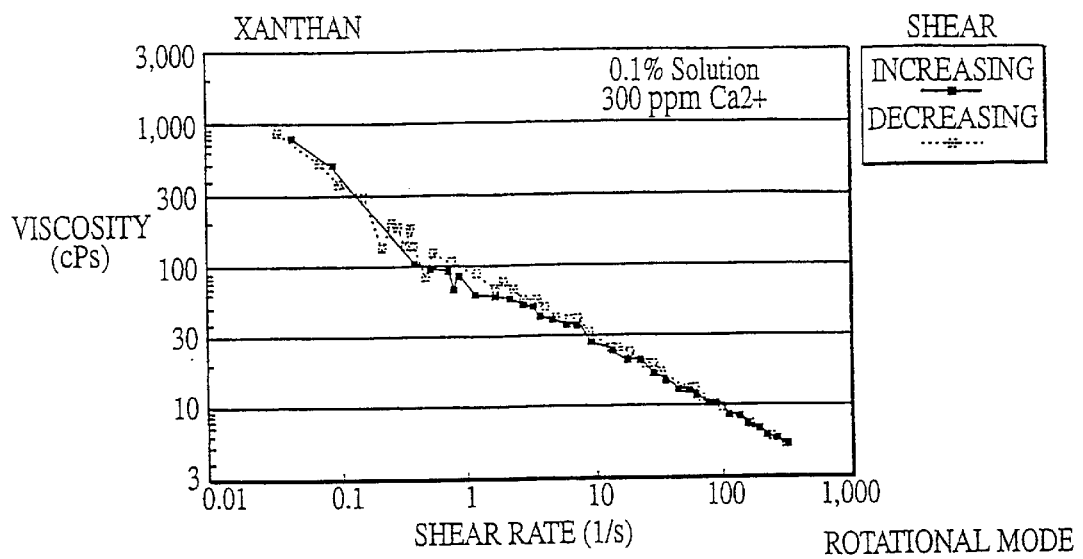
FIG. 5 depicts the linear plot of stress as a function of shear rate of xanthan.

In addition, FIGS. 3 and 4 illustrate the rheological behavior observed for the low methoxyl pectins of the present invention (Examples 15 and 16). As shown, FIGS. 3 and 4 display classic pseudoplastic behavior similar to the idealized behavior described in FIG. 2. The test pectin shown in FIG. 4, however, shows some thixotropy, or time dependent structure recovery. For comparison, the rheological profile of xanthan is shown in FIG. 5.

Phase separation in test beverage systems increases as the degree of esterification of the amidated types increases. However, as shown in Table 2, an ester content of about 40% is required before the pectins began to stabilize the particles in the test beverage systems (target rheology with little or no osbservable gel contraction). The target rheology is evaluated from theological evaluations of the pectins in a synthetic beverage system with two levels of calcium added (150 and 300 ppm). A strong correlation to the idealized rheology seen in FIG. 2 is ranked with +++, while samples which display rheological behavior far from the idealized rheology are ranked with − or −−. This evaluation is done to rapidly screen numerous test pectin samples before more rigorous evaluations are conducted.

Examples 20 to 24 provided below illustrate the different yield point and low shear viscosity of the LMP of the present invention and xanthan. The yield point and low shear viscosity is measured using any known technique in the art. The results of Examples 20 to 24 are shown in Table 3 below.

Example 20

Low Methoxyl Pectin of the Present Invention

Prepared by Deesterification

The low methoxyl pectin of this example is the prepared using in the same procedures described in Example 15 above.

This low methoxyl pectin is used to evaluate the yield point and low shear viscosity of the pectin.

Example 21

Low Methoxyl Pectin of the Present Invention

Prepared by Deesterification

The low methoxyl pectin of this example is the prepared using in the same procedures described in Example 16 above.

This low methoxyl pectin is used to evaluate the yield point and low shear viscosity of the pectin.

Example 22

Low Methoxyl Amidated Pectin of the Present Invention

Prepared by Deesterification and Amidation

The low methoxyl amidated pectin of this example is the prepared using in the same procedures described in Example 7 above.

This low methoxyl amidated pectin is used to evaluate the yield point and low shear viscosity of the pectin.

Example 23

Low Methoxyl Amidated Pectin of the Present Invention

Prepared by Deesterification and Amidation

The low methoxyl amidated pectin of this example is the prepared using in the same procedures described in Example 6 above.

This low methoxyl amidated pectin is used to evaluate the yield point and low shear viscosity of the pectin.

Example 24

Xanthan

The xanthan used in this example is the same xanthan used in Example 2 above, Keltrol manufactured by NutraSweet Company (Chicago, Ill.).

This xanthan is used to evaluate the yield point and low shear viscosity of the xanthan.

TABLE 3

Yield Point Data

| Example No. | Yield Point (Pa) | Low Shear Viscosity* (cPs.) |
| --- | --- | --- |
| 20 | 0.38 | 1200 |
| 21 | 0.21 | 1800 |
| 22 | 0.03 | 400 |
| 23 | 0.03 | 400 |
| 24 | 0.65 | 800 |

*measured at 0.04 s$^{-1}$

Table 3 above illustrates the yield point data determined by the Bingham extrapolation method. As can be seen, the two conventional pectin types have both higher yield points and higher low shear viscosity than the amidated types prepared. Interestingly, all of the pectin samples have yield points less than the xanthan control samples tested, while xanthan has a low hear viscosity falling between the conventional and the amidated pectins. This may partly explain the improved organoleptic perception the pectin samples have in beverage applications when compared to xanthan.

Examples 5 to 34 provided below illustrate the different degree of esterification, degree of amidation, and particle sedimentation of beverages containing suspension aids known in the art and LMP of the present invention. The degree of esterification, degree of amidation, and particle sedimentation are measured by any known technique in the art. The results of example 25 to 34 are shown in Table 5 below.

In Examples 25 to 34, particle sedimentation is evaluated by placing samples of beverages, to which the test pectins are added, into 15 cm screw capped tubes. The tubes are allowed to stand refrigerated for four weeks. At that point, the height of the clear liquid column above the article suspension layer is measured. A percent particle sedimentation is calculated by dividing the height of the clear layer by the total height of the liquid in the tube (clear+pulp suspended).

The ingredients used to prepare the beverages are shown in Table 4 below.

TABLE 4

| Ingredient | Amount (g or ml) |
| --- | --- |
| Deionized water | 166.97 g |
| Test pectin or xanthan | 0.2 g |
| Sucrose | 24 g |
| Calcium$^{(1)}$ | 8.33 ml |
| Citric acid$^{(2)}$ | 0.5 g |

$^{(1)}$6000 ppm stock solution prepared with CaCl$_2$ *2H$_2$O
$^{(2)}$50% citric acid stock solution The procedure for preparing the synthetic beverage is described below.

Heat water to 90° C. Add pectin slowly to hot water while mixing with Silverson mixer. Add sugar to the mixture while mixing. Add calcium solution to the mixture while mixing. Adjust the pH of the solution to 3.0 with additional citric acid as needed. Pour hot solution into a suitable container. Cool to room temperature. Refrigerate as needed.

Particle sedimentation is evaluated by placing samples of commercially available juice based beverages, to which the test pectins are added, into 15 cm screw capped tubes. Examples of such beverages which contain insoluble particles include Frutopia Strawberry Passion, Libby Juicy Juice, Ocean Spray Orange Juice, Ocean Spray Ruby Red Grapefruit Juice, Snapple Island Cocktail, and Tropicana Twister.

Solutions of the test pectins are prepared and added to the beverages to achieve a final concentration of 0.1 wt. %. The tubes are allowed to stand refrigerated for four weeks. At that point, the height of the clear liquid column above the particle suspension/phase separation layer is measured. A percent contraction is calculated by dividing the height of the clear layer by the total height of the liquid in the tube (clear+pulp suspended).

Example 25

Control Example

The NCSP used in this example is prepared using the procedures of Example 1 above.

NCSP is used to evaluate degree of esterification, degree of amidation, and particle sedimentation prevention effect of the NCSP.

Example 26

Xanthan

The xanthan used in this example is the same xanthan used in Example 2 above, Keltrol manufactured by NutraSweet Company (Chicago, Ill.).

Xanthan is used to evaluate degree of esterification, degree of amidation, and particle sedimentation of the xanthan.

Example 27

Low Methoxyl Amidated Pectin of the Present Invention

Prepared by Deesterification and Amidation

The low methoxyl amidated pectin of this example is the prepared using in the same procedures described in Example 6 above.

This low methoxyl amidated pectin is used to evaluate degree of esterification, degree of amidation, and particle sedimentation of the pectin.

Example 28

Low Methoxyl Amidated Pectin of the Present Invention

Prepared by Deesterification and Amidation

The low methoxyl amidated pectin of this example is the prepared using in the same procedures described in Example 7 above.

This low methoxyl amidated pectin is used to evaluate degree of esterification, degree of amidation, and particle sedimentation of the pectin.

Example 29

Low Methoxyl Amidated Pectin Known in the Art

Prepared by Deesterification and Amidation

The low methoxyl amidated pectin of this example is the same as the pectin described in Example 14 above.

This low methoxyl amidated pectin, Genu pectin Type LM 104AS manufactured by Hercules Incorporated (Wilmington, Del.), is used to evaluate degree of esterification, degree of amidation, and particle sedimentation of the pectin.

Example 30

Low Methoxyl Amidated Pectin Known in the Art

Prepared by Deesterification and Amidation

The low methoxyl amidated pectin of this example is the same as the pectin described in Example 11 above.

This low methoxyl amidated pectin, Genu pectin Type LM 101AS manufactured by Hercules Incorporated (Wilmington, Del.), is used to evaluate degree of esterification, degree of amidation, and particle sedimentation of the pectin.

Example 31

Low Methoxyl Conventional (LMC) Pectin of the Present Invention Prepared by Deesterification

The low methoxyl pectin of this example is the prepared using in the same procedures described in Example 15 above.

This low methoxyl conventional pectin is used to evaluate degree of esterification, degree of amidation, and particle sedimentation of the pectin.

Example 32

Low Methoxyl Conventional (LMC) Pectin of the Present Invention Prepared by Deesterification

The low methoxyl pectin of this example is prepared using in the same procedures described in Example 16 above.

The low methoxyl pectin is used to evaluate degree of esterification, degree of amidation, and particle sedimentation of the pectin.

Example 33

Low Methoxyl Conventional (LMC) Pectin Known in the Art Prepared by Deesterification

The low methoxyl pectin of this example is the same as the pectin described in Example 18 above.

This low methoxyl pectin, Genu pectin Type LM 18 CG manufactured by Hercules Incorporated (Wilmington, Del.), is used to evaluate degree of esterification, degree of amidation, and particle sedimentation of the pectin.

Example 34

Low Methoxyl Conventional (LMC) Known in the Art

Prepared by Deesterification

The low methoxyl pectin of this example is the same as the pectin described in Example 19 above.

This low methoxyl pectin, Genu pectin Type LM 12 CG manufactured by Hercules Incorporated (Wilmington, Del.), is used to evaluate degree of esterification, degree of amidation, and particle sedimentation of the pectin.

TABLE 5

| Example No. | DE (%) | DA (%) | Particle sedimentation (%) |
|---|---|---|---|
| 25 |  | n/a | 91.2 |
| 26 | n/a | n/a | 0 |
| 27 | 51.3 | 20.8 | 3.0 |
| 28 | 40.9 | 4.7 | 10.3 |
| 29 | 30.0 | 20.0 | 64.9 |
| 30 | 35.0 | 25.0 | 45.8 |
| 31 | 40.2 | 0.0 | 7.0 |
| 32 | 23.5 | 0.0 | 17.5 |
| 33 | 40.0 | 0.0 | 70.2 |
| 34 | 30.0 | 0.0 | 40.4 |

As seen in Table 5, the pectins of the present invention are far superior to standard commercial pectin types evaluated with similar DE and DA values. In addition, the pectins of the present invention approach the value of xanthan, for which there is substantially no observable particle sedimentation.

Examples 35 to 39 provided below illustrate the different viscosity at various shear rate of the present invention and xanthan. The viscosity is measured as described above in the Example section. The results of Examples 35 to 39 are shown in Table 6 below.

Example 35

Low Methoxyl Conventional (LMC) Pectin of the Present Invention

Prepared by Deesterification

The low methoxyl pectin of this example is the prepared using the same procedures described in Example 15 above.

This low methoxyl pectin is used to evaluate the viscosity at various shear rate as shown in Table 6.

Example 36

Low Methoxyl Conventional (LMC) Pectin of the Present Invention

Prepared by Deesterification

The low methoxyl content pectin of this example is the prepared using the same procedures described in Example 16 above.

The viscosity of the low methoxyl pectin is evaluated the at various shear rates as shown in Table 6.

Example 37

Low Methoxyl Amidated Pectin of the Present Invention

Prepared by Deesterification and Amidation

The low methoxyl amidated pectin of this example is the prepared using the same procedures described in Example 7 above.

The low methoxyl amidated pectin is used to evaluate the viscosity at various shear rate as shown in Table 6.

Example 38

Low Methoxyl Amidated Pectin of the Present Invention

Prepared by Deesterification and Amidation

The low methoxyl amidated pectin of this example is the prepared using the same procedures described in Example 6 above.

This methoxyl amidated pectin is used to evaluate the viscosity at various shear rate as shown in Table 6.

Example 39

Xanthan

The xanthan used in this example is the same xanthan used in Example 2 above, Keltrol manufactured by NutraSweet Company (Chicago, Ill.).

This xanthan is used to evaluate the viscosity at various shear rate as shown in Table 6.

TABLE 6

| Sample | Shear Rate = 50 s$^{-1}$ | | Shear Rate = 100 s$^{-1}$ | |
|---|---|---|---|---|
| | Viscosity (cPs) | % reduction compared to Xanthan | Viscosity (cPs) | % reduction compared to Xanthan |
| 35 (LMC) | 10.0 | 23.1 | 7.0 | 46.1 |
| 36 (LMC) | 7.5 | 42.3 | 5.5 | 57.7 |
| 37 (LMA) | 3.0 | 76.9 | 2.5 | 80.8 |
| 38 (LMA) | 2.5 | 80.8 | 2.0 | 84.5 |
| 39 (Xanthan) | 13.0 | n/a | 9.0 | n/a |

Also, as shown in Table 6, the shear rates, at which the pectins of the present invention cover the range of 50 to 100 s$^{-1}$, are typically associated with the mechanical action of eating, chewing, drinking, and swallowing.

Figure 6:
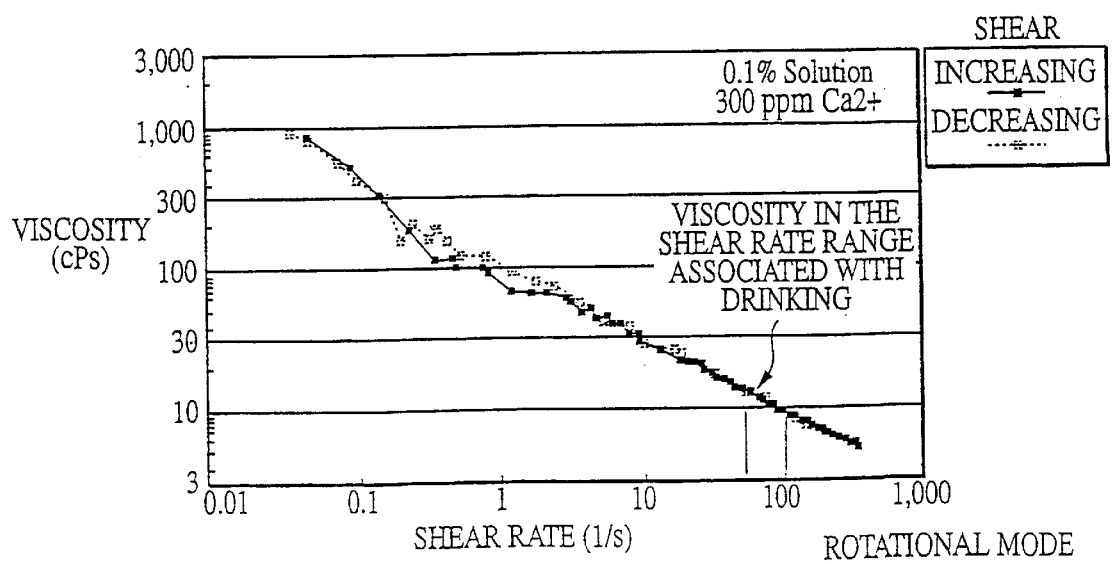
FIG. 6 depicts the linear plot of stress as a function of shear rate of the pectin of the present invention.

A typical viscosity vs. shear rate plot is depicted in FIG. 6 with 50 to 100 s$^{-1}$ indicated.

The data in Table 6 below shows that the pectins of the present invention have a viscosity 23.1% to 80.8% lower than xanthan at 50 s$^{-1}$, and 46.1% to 84.5% lower than xanthan at 100 s$^{-1}$.

The preceding examples can be repeated by substituting the generically and specifically described constituents and/or operating conditions of this invention for those used in the preceding examples. From the foregoing descriptions, one skilled in the art can easily ascertain the essential characteristics of this invention, and without departing from the spirit and scope thereof, can make various changes and modifications of the invention to adapt to various usages and conditions.

What is claimed is:

1. A low methoxyl pectin having a degree of esterification of from about 20% to 50% and displaying pseudoplasticity and substantially no phase separation in aqueous solution comprising at least one polyvalent cation.

2. The low methoxyl pectin of claim 1, wherein the amount of polyvalent cation is from about 10 ppm to about 1,000 ppm, and wherein the polyvalent cation is selected from one of aluminum ions, iron ions, magnesium ions, calcium ions, or manganese ions.

3. The low methoxyl pectin of claim 2, wherein the polyvalent cation is calcium ion, and wherein the amount of calcium ion is from about 50 ppm to about 500 ppm.

4. The low methoxyl pectin of claim 3, wherein the amount of calcium ion is from about 200 ppm to about 300 ppm.

5. The low methoxyl pectin of claim 2, wherein the amount of phase separation in the aqueous solution is at most about 10%.

6. The low methoxyl pectin of claim 5, wherein the amount of phase separation in the aqueous solution is at most about 3%.

7. A low methoxyl pectin having a degree of esterification of from about 20% to 50% and displaying pseudoplasticity and substantially no particle sedimentation in aqueous solution comprising at least one polyvalent cation, wherein the polyvalent cation is selected from one of aluminum ions, iron ions, magnesium ions, calcium ions, or manganese ions, wherein the amount of polyvalent cation is from about 10 ppm to about 1,000 ppm, and wherein the amount of particle sedimentation in the aqueous solution is at most about 10%.

8. The low methoxyl pectin of claim 7 wherein the polyvalent cation is calcium ion in the amount of from about 20 ppm to about 300 ppm, and wherein the amount of particle sedimentation in the aqueous solution is at most about 3%.

9. The low methoxyl pectin of claim 1 having a degree of esterification from about 24% to 40%.

10. The low methoxyl pectin of claim 1 having a molecular weight from about 60 to 150 kDalton.

11. The low methoxyl pectin of claim 10 having a molecular weight from about 80 to 100 kDalton.

12. The low methoxyl pectin of claim 10 having a viscosity of at least about 300 cPs at a shear rate of about 0.04 s$^{-1}$.

13. The low methoxyl pectin of claim 12 having a viscosity from about 800 to 1,200 cPs at a shear rate of about 0.04 s$^{-1}$.

14. The low methoxyl pectin of claim 12 having a viscosity from about 1 to 20 cPs at a shear rate of about 50 s$^{-1}$.

15. The low methoxyl pectin of claim 14 having a viscosity from about 2 to 10 cPs at a shear rate of about 50 s$^{-1}$.

16. The low methoxyl pectin of claim 12 having a viscosity from about 1 to 15 cPs at a shear rate of about 100 s$^{-1}$.

17. The low methoxyl pectin of claim 16 having a viscosity from about 2 to 7 cPs at a shear rate of about 100 s$^{-1}$.

18. The low methoxyl pectin of claim 16 wherein the low methoxyl pectin is a powder form.

19. The low methoxyl pectin of claim 16 wherein the low methoxyl pectin is an aqueous form which has a pH from about 2 to 6.

20. The low methoxyl pectin of claim 1 having a degree of amidation from about 1 to 30%.

21. The low methoxyl pectin of claim 20 having a degree of amidation from about 4 to 21%.

22. The low methoxyl pectin of claim 10 having a degree of amidation from about 1 to 30%.

23. The low methoxyl pectin of claim 22 having a degree of amidation from about 4 to 21%.

24. The low methoxyl pectin of claim 22 having a molecular weight from about 60 to 150 kDalton.

25. The low methoxyl pectin of claim 24 having a molecular weight from about 80 to 100 kDalton.

26. The low methoxyl pectin of claim 24 having a viscosity of at least about 300 cPs at a shear rate of about 0.04 s$^{-1}$.

27. The low methoxyl pectin of claim 26 having a viscosity from about 800 to 1,200 cPs at a shear rate of about 0.04 s$^{-1}$.

28. The low methoxyl pectin of claim 26 having a viscosity from about 1 to 20 cPs at a shear rate of about 50 s$^{-1}$.

29. The low methoxyl pectin of claim 28 having a viscosity from about 2 to 10 cPs at a shear rate of about 50 s$^{-1}$.

30. The low methoxyl pectin of claim 28 having a viscosity from about 1 to 15 cPs at a shear rate of about 100 s$^{-1}$.

31. The low methoxyl pectin of claim 30 having a viscosity from about 2 to 7 cPs at a shear rate of about 100 s$^{-1}$.

32. The low methoxyl pectin of claim 30 wherein the low methoxyl pectin is in a powder form.

33. The low methoxyl pectin of claim 30 wherein the low methoxyl pectin is in an aqueous form which has a pH from about 2 to 6.

34. A process for preparing a low methoxyl pectin having a degree of esterification of from about 20% to 50% and displaying pseudoplasticity and substantially no phase separation in aqueous solution which comprises treating a pectin starting material having a degree of esterification of greater than about 60% to obtain at least a non-calcium sensitive pectin fraction, wherein the aqueous solution comprises at least one polyvalent cation.

35. The process of claim 34, wherein the amount of polyvalent cation is from about 10 ppm to about 1,000 ppm, and wherein the polyvalent cation is selected from one of aluminum ions, iron ions, magnesium ions, calcium ions, or manganese ions.

36. The process of claim 35, wherein the polyvalent cation is calcium ion, and wherein the amount of calcium ion is from about 50 ppm to about 500 ppm.

37. The process of claim 36, wherein the amount of calcium ion is from about 200 ppm to about 300 ppm.

38. The process of claim 35, wherein the amount of phase separation in the aqueous solution is at most about 10%.

39. The process of claim 37, wherein the amount of phase separation in the aqueous solution is at most about 3%.

40. A process for preparing a low methoxyl pectin having a degree of esterification of from about 20% to 50% and displaying pseudoplasticity and substantially no particle sedimentation in aqueous solution which comprises treating a pectin starting material having a degree of esterification of greater than about 60% to obtain at least a non-calcium sensitive pectin fraction,
    wherein the aqueous solution comprises at least one polyvalent cation selected from one of aluminum ions, iron ions, magnesium ions, calcium ions, or manganese ions,
    wherein the amount of polyvalent cation is from about 10 ppm to about 1,000 ppm, and wherein the amount of particle sedimentation in the aqueous solution is at most about 10%.

41. The process of claim 40 wherein the polyvalent cation is calcium ion in the amount of from about 20 ppm to about 300 ppm, and wherein the amount of particle sedimentation in the aqueous solution is at most about 3%.

42. The process of claim 34 wherein the non-calcium sensitive pectin is prepared by treating a pectin starting material having a degree of esterification of greater than about 60% with a cation-containing preparation and an enzyme to obtain the non-calcium sensitive pectin fraction.

43. The process of claim 34 wherein the non-calcium sensitive pectin is prepared by (a) treating a pectin starting material having a degree of esterification of greater than about 60% with an enzyme; or (b) reesterifying the calcium sensitive pectin fraction to obtain the non-calcium sensitive pectin fraction.

44. The process of claim 34 wherein the non-calcium sensitive pectin is prepared by:
    (a) treating a pectin starting material having a degree of esterification of greater than about 60% with a cation-containing preparation to obtain at least a non-calcium sensitive pectin fraction and a calcium sensitive pectin fraction;
    (b) separating the non-calcium sensitive pectin fraction from the calcium sensitive pectin fraction; and
    (c) deesterifying or deesterifying and amidating the non-calcium sensitive pectin fraction to obtain the low methoxyl pectin.

45. The process of claim 34 wherein the pectin starting material has a degree of esterification which is at least about 60%.

46. The process of claim 45 wherein the pectin starting material has a degree of esterification which is at least about 70%.

47. The process of claim 45 wherein the pectin starting material is obtained from at least one of citrus peels, apple juices, apple ciders, apple pomace, sugar beets, sunflower heads, vegetables or waste products from plants selected from at least one of apples, sugar beet, sunflower and citrus fruits.

48. The process of claim 47 wherein the pectin starting material is obtained from at least one of limes, lemons, grapefruits, and oranges.

49. The process of claim 44 prepared by deesterifying or deesterifying and amidating a non-calcium sensitive pectin to obtain the low methoxyl pectin.

50. The process of claim 49 prepared by deesterifying a non-calcium sensitive pectin to obtain the low methoxyl pectin.

51. The process of claim 50 wherein the non-calcium sensitive pectin is deesterified with an acid in a random fashion to obtain the low methoxyl pectin.

52. The process of claim 51 wherein the acid is at least one of nitric, hydrochloric, or sulfuric.

53. The process of claim 51 wherein the degree esterification of the low methoxyl pectin is from about 24% to 40%.

54. The process of claim 49 prepared by deesterifying and amidating a non-calcium sensitive pectin to obtain the low methoxyl pectin.

55. The process of claim 54 prepared by deesterifying and amidating a non-calcium sensitive pectin with a base in a random fashion to obtain the low methoxyl pectin.

56. The process of claim 55 wherein the base is at least one of sodium hydroxide or ammonia.

57. The process of claim 55 wherein the degree amidation of the low methoxyl pectin is from about 1 to 30%.

58. The process of claim 57 wherein the degree amidation of the low methoxyl pectin is from about 4% to 21%.

59. The process of claim 49 wherein the low methoxyl pectin is a powder form or aqueous form.

60. The process of claim 49 wherein the low methoxyl pectin has a molecular weight from about 60 to 150 kDalton.

61. The process of claim 58 wherein the low methoxyl pectin has a molecular weight from about 80 to 100 kDalton.

62. The process of claim 58 wherein the low methoxyl pectin has a viscosity of at least about 300 cPs at a shear rate of about 0.04 s$^{-1}$.

63. The process of claim 62 wherein the low methoxyl pectin has a viscosity from about 800 to 1,200 cPs at a shear rate of about 0.04 s$^{-1}$.

64. The process of claim 62 wherein the low methoxyl pectin has a viscosity from about 1 to 20 cPs at a shear rate of about 50 s$^{-1}$.

65. The process of claim 64 wherein the low methoxyl pectin has a viscosity from about 2 to 10 cPs at a shear rate of about 50 s$^{-1}$.

66. The process of claim 64 wherein the low methoxyl pectin has a viscosity from about 1 to 15 cPs at a shear rate of about 100 s$^{-1}$.

67. The process of claim 66 wherein the low methoxyl pectin has a viscosity from about 2 to 7 cPs at a shear rate of about 100 s$^{-1}$.

68. The process of claim 49 wherein the non-calcium sensitive pectin fraction has a degree of esterification that is at least about 1% and at most about 15% higher than the degree of esterification of the starting material.

69. The process of claim 68 wherein the non-calcium sensitive pectin fraction has a degree of esterification that is at least about 7% and at most about 15% higher than the degree of esterification of the starting material.

70. A process for stabilizing insoluble components in an aqueous system which comprises adding a low methoxyl pectin to an aqueous system, wherein the low methoxyl pectin has a degree of esterification of from about 20% to 50% and displays pseudoplasticity and substantially no phase separation in aqueous solution, and wherein the aqueous solution comprises at least one polyvalent cation.

71. The process of claim 70, wherein the amount of polyvalent cation is from about 10 ppm to about 1,000 ppm, and wherein the polyvalent cation is selected from one of aluminum ions, iron ions, magnesium ions, calcium ions, or manganese ions.

72. The process of claim 71, wherein the polyvalent cation is calcium ion, and wherein the amount of calcium ion is from about 50 ppm to about 500 ppm.

73. The process of claim 72, wherein the amount of calcium ion is from about 200 ppm to about 300 ppm.

74. The process of claim 71, wherein the amount of phase separation in the aqueous solution is at most about 10%.

75. The process of claim 74, wherein the amount of phase separation in the aqueous solution is at most about 3%.

76. A process for stabilizing insoluble components in an aqueous system which comprises adding a low methoxyl pectin to an, aqueous system, wherein the low methoxyl pectin has a degree of esterification of from about 20% to 50% and displays pseudoplasticity and substantially no particle sedimentation in aqueous solution,
   wherein the aqueous solution comprises at least one polyvalent cation selected from one of aluminum ions, iron ions, magnesium ions, calcium ions, or manganese ions,
   wherein the amount of polyvalent cation is from about 10 ppm to about 1,000 ppm, and wherein the amount of particle sedimentation in the aqueous solution is at most about 10%.

77. The process of claim 76 wherein the polyvalent is calcium ion in the amount of from about 20 ppm to about 300 ppm, and wherein the amount of particle sedimentation in the aqueous solution is at most about 3%.

78. The process of claim 70 further comprises adding a food, or cosmetic or pharmaceutical product to the aqueous system.

79. The process of claim 78 wherein the low methoxyl pectin has a molecular weight from about 60 to 150 kDalton.

80. The process of claim 79 wherein the low methoxyl pectin has a molecular weight from about 80 to 100 kDalton.

81. The process of claim 79 wherein the low methoxyl pectin has a viscosity of at least about 300 cPs at a shear rate of about 0.04 s$^{-1}$.

82. The process of claim 81 wherein the low methoxyl pectin has a viscosity from about 800 to about 1,200 cPs at a shear rate of about 0.04 s$^{-1}$.

83. The process of claim 81 wherein the low methoxyl pectin has a viscosity from about 1 to 20 cPs at a shear rate of about 50 s$^{-1}$.

84. The process of claim 83 wherein the low methoxyl pectin has a viscosity from about 2 to 10 cPs at a shear rate of about 50 s$^{-1}$.

85. The process of claim 83 wherein the low methoxyl pectin has a viscosity from about 1 to 15 cPs at a shear rate of about 100 s$^{-1}$.

86. The process of claim 85 wherein the low methoxyl pectin has a viscosity from about to 7 cPs at a shear rate of about 100 s$^{-1}$.

87. The process of claim 85 wherein the low methoxyl pectin is prepared from a non-calcium sensitive pectin.

88. The process of claim 87 wherein the low methoxyl pectin is prepared by deesterifying or deesterifying and amidating a non-calcium sensitive pectin.

89. The process of claim 88 wherein the low methoxyl pectin is prepared by deesterifying a non-calcium sensitive pectin.

90. The process of claim 89 wherein the non-calcium sensitive pectin is deesterified with an acid in a random fashion.

91. The process of claim 90 wherein the acid is at least one of nitric, hydrochloric, sulfuric, preferably nitric or hydrochloric.

92. The process of claim 90 wherein the degree of esterification of the low methoxyl pectin is from about 24% to 40%.

93. The process of claim 88 prepared by deesterifying and amidating a non-calcium sensitive pectin.

94. The process of claim 93 prepared by deesterifying and amidating a non-calcium sensitive pectin with a base in a random fashion.

95. The process of claim 94 wherein the base is at least one of sodium hydroxide or ammonia.

96. The process of claim 88 wherein the degree amidation of the low methoxyl pectin is from about 1% to 30%.

97. The process of claim 96 wherein the degree amidation of the low methoxyl pectin is from about 4% to 21%.

98. The process of claim 96 wherein the pH of the aqueous system is from about 2.5 to 5.

99. The process of claim 98 wherein the pH of the aqueous system is from about 3 to 5.

100. The process of claim 98 wherein the low methoxyl pectin is in a powder form or aqueous form.

101. The process of claim 70 wherein the low methoxyl pectin displays pseudoplasticity and substantially no phase separation in aqueous solution which comprises treating a pectin starting material having a degree of esterification of greater than about 60% to obtain at least a non-calcium sensitive pectin fraction.

102. The process of claim 70 wherein the non-calcium sensitive pectin is prepared by treating a pectin starting material having a degree of esterification of greater than about 60% with a cation-containing preparation and an enzyme to obtain the non-calcium sensitive pectin fraction.

103. The process of claim 70 wherein the non-calcium sensitive pectin is prepared by (a) treating a pectin starting material having a degree of esterification of greater than about 60% with an enzyme; or (b) reesterifying the calcium sensitive pectin fraction to obtain the non-calcium sensitive pectin fraction.

104. The process of claim 70 wherein the non-calcium sensitive pectin is prepared by the steps which comprise:
   (a) treating a pectin starting material having a degree of esterification of greater than about 60% with a cation-containing preparation to obtain at least a non-calcium sensitive pectin fraction and a calcium sensitive pectin fraction;
   (b) separating the non-calcium sensitive pectin fraction from the calcium sensitive pectin fraction; and
   (c) deesterifying or deesterifying and amidating the non-calcium sensitive pectin fraction to obtain the low methoxyl pectin.

105. The process of claim 104 wherein the pectin starting material has a degree of esterification which is at least about 60%.

106. The process of claim 105 wherein the pectin starting material has a degree of esterification which is at least about 70%.

107. The process of claim 106 wherein the pectin starting material is obtained from at least one of citrus peels, apple juices, apple ciders, apple pomade, sugar beets, sunflower heads, vegetables or waste products from plants selected from at least one of apples, sugar beet, sunflower and citrus fruits.

108. The process of claim 107 wherein the pectin starting material is obtained from at least one of limes, lemons, grapefruits, and oranges.

* * * * *